(12) United States Patent
Harada

(10) Patent No.: US 12,055,702 B2
(45) Date of Patent: Aug. 6, 2024

(54) OBJECTIVE LENS FOR ENDOSCOPE AND ENDOSCOPE

(71) Applicant: FUJIFILM Corporation, Tokyo (JP)

(72) Inventor: Keisuke Harada, Saitama (JP)

(73) Assignee: FUJIFILM Corporation, Tokyo (JP)

(*) Notice: Subject to any disclaimer, the term of this patent is extended or adjusted under 35 U.S.C. 154(b) by 447 days.

(21) Appl. No.: 17/453,377

(22) Filed: Nov. 3, 2021

(65) Prior Publication Data

US 2022/0163784 A1 May 26, 2022

(30) Foreign Application Priority Data

Nov. 25, 2020 (JP) .................................. 2020-195416

(51) Int. Cl.
| | |
|---|---|
| *G02B 23/24* | (2006.01) |
| *G02B 9/34* | (2006.01) |
| *G02B 9/62* | (2006.01) |
| *G02B 13/18* | (2006.01) |

(52) U.S. Cl.
CPC ............. *G02B 23/243* (2013.01); *G02B 9/34* (2013.01); *G02B 9/62* (2013.01); *G02B 13/18* (2013.01)

(58) Field of Classification Search
CPC .......... G02B 23/243; G02B 9/34; G02B 9/62; G02B 13/18; G02B 13/006; G02B 13/0045
See application file for complete search history.

(56) References Cited

U.S. PATENT DOCUMENTS

| | | | | |
|---|---|---|---|---|
| 2011/0317285 A1* | 12/2011 | Ohashi | ............... | G02B 27/0025 359/753 |
| 2013/0033763 A1* | 2/2013 | Sunaga | ............... | G02B 13/0045 359/713 |
| 2015/0022907 A1* | 1/2015 | Yamamoto | ......... | G02B 23/2438 359/749 |
| 2018/0373018 A1 | 12/2018 | Katakura | | |
| 2019/0154946 A1 | 5/2019 | Ohashi | | |

FOREIGN PATENT DOCUMENTS

| | | |
|---|---|---|
| CN | 109946814 A | 6/2019 |
| JP | H01-269909 A | 10/1989 |
| JP | 2556984 B2 | 11/1996 |
| JP | 2639963 B2 | 8/1997 |
| JP | 5478421 B2 | 4/2014 |
| JP | 5855793 B2 | 2/2016 |
| JP | 2019-095607 A | 6/2019 |

OTHER PUBLICATIONS

An Office Action; "Notice of Reasons for Refusal," mailed by the Japanese Patent Office on Apr. 2, 2024, which corresponds to Japanese Patent Application No. 2020-195416 and is related to U.S. Appl. No. 17/453,377; with English language translation.

* cited by examiner

*Primary Examiner* — George G. King
*Assistant Examiner* — Anna Smith
(74) *Attorney, Agent, or Firm* — Studebaker & Brackett PC

(57) ABSTRACT

The objective lens for an endoscope consists of, in order from an object side, a first lens group consisting of one negative lens, a second lens group consisting of two lenses cemented together, a stop, a third lens group consisting of two lenses that have refractive powers with different signs and are cemented together, and a fourth lens group consisting of two lenses that have refractive powers with different signs and are cemented together. The objective lens for an endoscope satisfies a predetermined conditional expression regarding an Abbe number, a length of a lens system, and the like.

20 Claims, 18 Drawing Sheets

EXAMPLE 1

EXAMPLE 2

EXAMPLE 3

EXAMPLE 4

EXAMPLE 7

EXAMPLE 8

OBJECTIVE LENS FOR ENDOSCOPE AND ENDOSCOPE

CROSS-REFERENCE TO RELATED APPLICATIONS

The present application claims priority under 35 U.S.C. § 119 to Japanese Patent Application No. 2020-195416, filed on Nov. 25, 2020. Each application above is hereby expressly incorporated by reference, in its entirety, into the present application.

BACKGROUND

Technical Field

The present disclosure relates to an objective lens for an endoscope and an endoscope.

Related Art

In the related art, a lens system disclosed in JP5855793B, JP5478421B, JP2556984B, and JP2639963B is known as an optical system that can be used for an endoscope.

In recent years, there has been a demand for an objective lens for an endoscope in which both chromatic aberration correction and reduction in size are achieved and that has favorable performance.

SUMMARY

The present disclosure has been made in view of the above circumstances, and an object of the present disclosure is to provide an objective lens for an endoscope in which both chromatic aberration correction and reduction in size are achieved and that has favorable performance, and an endoscope comprising the objective lens for an endoscope.

An objective lens for an endoscope according to a first aspect of the present disclosure consists of, in order from an object side to an image side: a first lens group consisting of one negative lens; a second lens group consisting of two lenses cemented together; a stop; a third lens group consisting of two lenses that have refractive powers with different signs and are cemented together; and a fourth lens group consisting of two lenses that have refractive powers with different signs and are cemented together. Assuming that an Abbe number of a lens on the object side in the second lens group at a d line is v2f, an Abbe number of a lens on the image side in the second lens group at the d line is v2r, a distance on an optical axis from a lens surface on the object side in the first lens group to a lens surface closest to the image side in the fourth lens group is AL, and a paraxial radius of curvature of a cemented surface in the second lens group is R2c, Conditional Expression (1) is satisfied.

$$-300 < (v2f-v2r) \times |AL/R2c| < 30 \tag{1}$$

It is preferable that the objective lens for an endoscope according to the first aspect satisfies Conditional Expression (1-1).

$$-250 < (v2f-v2r) \times |AL/R2c| < 20 \tag{1-1}$$

An objective lens for an endoscope according to a second aspect of the present disclosure consists of, in order from an object side to an image side: a first lens group consisting of one negative lens; a second lens group consisting of two lenses cemented together; a stop; a third lens group consisting of two lenses that have refractive powers with different signs and are cemented together; and a fourth lens group consisting of two lenses that have refractive powers with different signs and are cemented together. Assuming that an Abbe number of a lens on the object side in the third lens group at a d line is v3f, an Abbe number of a lens on the image side in the third lens group at the d line is v3r, an Abbe number of a lens on the object side in the fourth lens group at the d line is v4f, an Abbe number of a lens on the image side in the fourth lens group at the d line is v4r, an expression having a larger value between |v3f-v3r| and |v4f-v4r| is |vf-vr|, a focal length of a whole system is f, a distance on an optical axis from a lens surface on the object side in the first lens group to a lens surface closest to the image side in the fourth lens group is AL, and an air conversion distance on the optical axis from the lens surface closest to the image side in the fourth lens group to a focal position on the image side of the whole system is Bf, Conditional Expression (2) is satisfied.

$$3.9 < |vf-vr| \times f/(AL+Bf) < 20 \tag{2}$$

It is preferable that the objective lens for an endoscope according to the second aspect satisfies Conditional Expression (2-1).

$$4 < |vf-vr| \times f/(AL+Bf) < 10 \tag{2-1}$$

In the objective lens for an endoscope according to the second aspect, assuming that an Abbe number of a lens on the object side in the second lens group at the d line is v2f, an Abbe number of a lens on the image side in the second lens group at the d line is v2r, and a paraxial radius of curvature of a cemented surface in the second lens group is R2c, it is preferable to satisfy Conditional Expression (1), and it is more preferable to satisfy Conditional Expression (1-1).

$$-300 < (v2f-v2r) \times |AL/R2c| < 30 \tag{1}$$

$$-250 < (v2f-v2r) \times |AL/R2c| < 20 \tag{1-1}$$

Hereinafter, in this section, the objective lens for an endoscope according to the first aspect and the objective lens for an endoscope according to the second aspect will be collectively referred to as the objective lens for an endoscope according to the aspect. In the objective lens for an endoscope according to the aspect, it is preferable that the second lens group has a positive refractive power as a whole. In the objective lens for an endoscope according to the aspect, it is preferable that the third lens group has a positive refractive power as a whole. In the objective lens for an endoscope according to the aspect, it is preferable that the fourth lens group has a positive refractive power as a whole.

In the objective lens for an endoscope according to the aspect, assuming that a focal length of the first lens group is f1, a focal length of the second lens group is f2, a focal length of the third lens group is f3, and a focal length of the fourth lens group is f4, it is preferable to satisfy Conditional Expression (3), and it is more preferable to satisfy Conditional Expression (3-1).

$$-30 < (f3 \times f4)/(f1 \times f2) < -0.2 \tag{3}$$

$$-20 < (f3 \times f4)/(f1 \times f2) < -0.4 \tag{3-1}$$

In the objective lens for an endoscope according to the aspect, assuming that a focal length of a whole system is f, a focal length of the second lens group is f2, a focal length of the third lens group is f3, and a focal length of the fourth lens group is f4, it is preferable to satisfy Conditional Expression (4), and it is more preferable to satisfy Conditional Expression (4-1).

$$10<(f2\times f3\times f4)/(fx\cdot fx\cdot f)<300 \quad (4)$$

$$30<(f2\times f3\times f4)/(fx\cdot fx\cdot f)<200 \quad (4\text{-}1)$$

In the objective lens for an endoscope according to the aspect, assuming that an air conversion distance on the optical axis from the lens surface closest to the image side in the fourth lens group to a focal position on the image side of a whole system is Bf, it is preferable to satisfy Conditional Expression (5), and it is more preferable to satisfy Conditional Expression (5-1).

$$1<AL/Bf<4 \quad (5)$$

$$2.2<AL/Bf<3 \quad (5\text{-}1)$$

In the objective lens for an endoscope according to the aspect, assuming that a distance on the optical axis from the lens surface on the object side in the first lens group to the stop is Df, and a distance on the optical axis from the stop to the lens surface closest to the image side in the fourth lens group is Dr, it is preferable to satisfy Conditional Expression (6), and it is more preferable to satisfy Conditional Expression (6-1).

$$|Df-Dr|/AL<1 \quad (6)$$

$$0.01<|Df-Dr|/AL<0.15 \quad (6\text{-}1)$$

In the objective lens for an endoscope according to the above aspect, assuming that a focal length of the third lens group is f3, and a focal length of the fourth lens group is f4, it is preferable to satisfy Conditional Expression (7), and it is more preferable to satisfy Conditional Expression (7-1).

$$f4/f3<5 \quad (7)$$

$$0.3<f4/f3<3 \quad (7\text{-}1)$$

In the objective lens for an endoscope according to the above aspect, assuming that a thickness of the second lens group on the optical axis is Dc2, and a thickness of the fourth lens group on the optical axis is Dc4, it is preferable to satisfy Conditional Expression (8).

$$Dc4/Dc2<1.2 \quad (8)$$

An endoscope of the present disclosure comprises at least one objective lens for an endoscope according to the aspect.

In the present specification, it should be noted that the terms "consisting of" and "consist of" mean that the lens may include not only the above-mentioned constituent elements but also lenses substantially having no refractive powers, optical elements, which are not lenses, such as a stop, a filter, and a cover glass, a lens flange, a lens barrel, an imaging element, and the like.

A compound aspherical lens (that is, a lens in which a spherical lens and a film having an aspherical shape formed on the spherical lens are integrally formed and function as one aspherical lens as a whole) is not regarded as a cemented lens, and is treated as one lens. Unless otherwise noted, the sign of the refractive power and the radius of curvature of a lens including an aspherical surface are defined in the paraxial region.

In the present specification, the term "whole system" means an objective lens for an endoscope. The term "focal length" used in the conditional expression is a paraxial focal length. The values used in the conditional expression are values on the d line basis. The "d line", "C line", and "F line" described in the present specification are emission lines. The wavelength of the d line is 587.56 nm (nanometers), the wavelength of the C line is 656.27 nm (nanometers), and the wavelength of the F line is 486.13 nm (nanometers).

According to the present disclosure, it is possible to provide an objective lens for an endoscope in which both chromatic aberration correction and reduction in size are achieved and that has favorable performance, and an endoscope comprising the objective lens for an endoscope.

DESCRIPTION OF EMBODIMENTS

Figure 1:
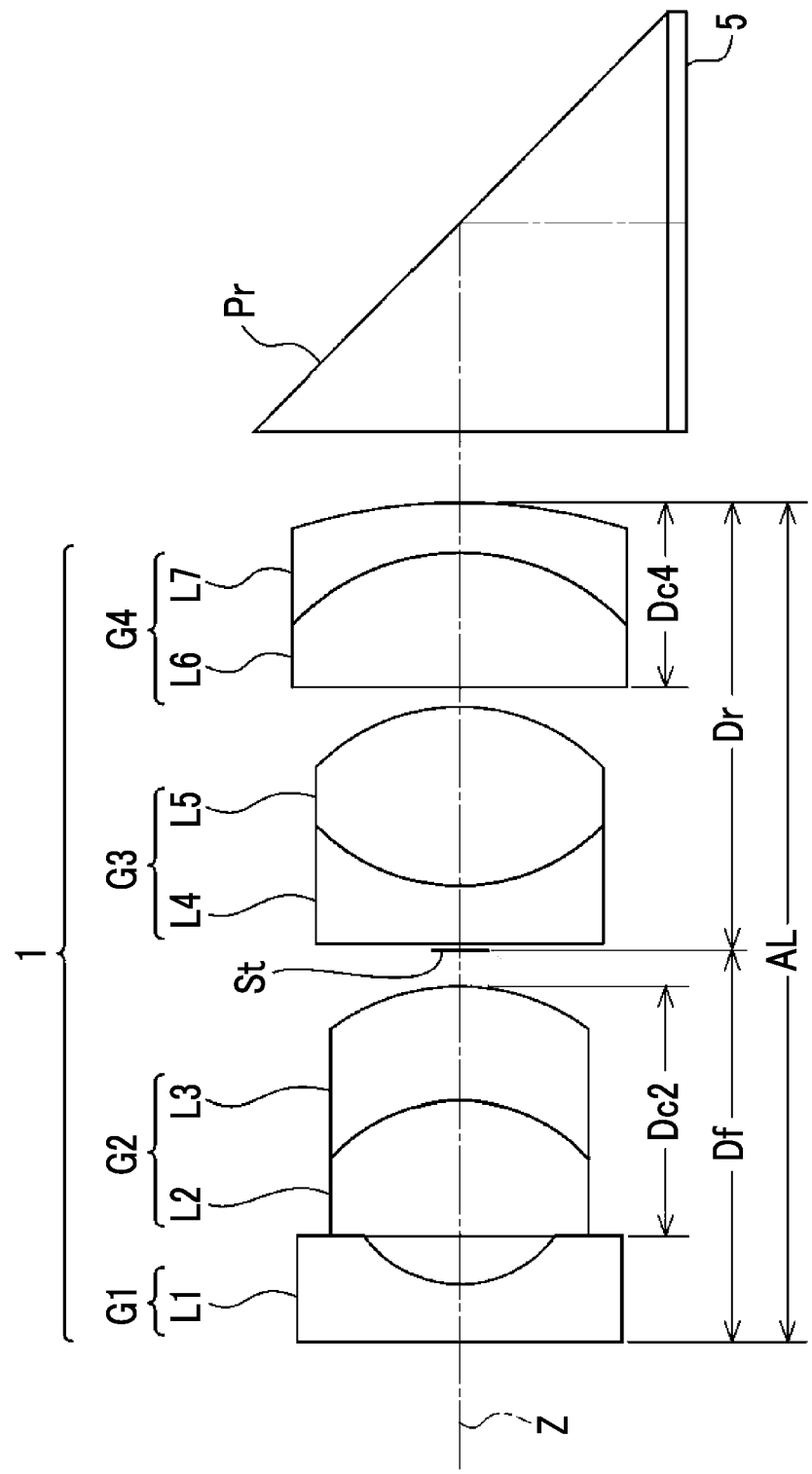
FIG. 1 is a cross-sectional view showing a configuration of an objective lens for an endoscope according to an embodiment.

Hereinafter, embodiments of the present disclosure will be described in detail with reference to the drawings. FIG. 1 shows a configuration of an objective lens 1 for an endoscope according to an embodiment of the present disclosure in a cross section including an optical axis Z. The example shown in FIG. 1 corresponds to Example 1 described below. In FIG. 1, the left side of the objective lens 1 for an endoscope is the object side, and the optical axis Z is indicated by a chain line. Light from the object passes through the objective lens 1 for the endoscope and then is incident into a prism Pr disposed on the image side of the objective lens 1 for the endoscope, and is reflected by a reflecting surface formed obliquely to the incident surface and then is incident into an imaging element 5 through an emission surface formed perpendicularly to the incident surface. The emission surface of the prism Pr is joined to the imaging element 5. The prism Pr in FIG. 1 functions as an optical path deflecting member that bends an optical path vertically.

The objective lens 1 for an endoscope consists of, in order from the object side to the image side along the optical axis Z, a first lens group G1, a second lens group G2, an aperture stop St, a third lens group G3, and a fourth lens group G4. The aperture stop St in FIG. 1 does not indicate the shape, and indicates the position in the optical axis Z direction.

The first lens group G1 consists of one negative lens. Since the first lens group G1 consists of a single lens having a negative refractive power, there is an advantage in ensuring a wide viewing angle for endoscopic observation while reducing the size. In addition, in the present specification, the term "single lens" means one uncemented lens.

The second lens group G2 consists of two lenses cemented together. That is, the second lens group G2 consists of a cemented lens formed by cementing two lenses. The two lenses composing the second lens group G2 may be two lenses that have refractive powers with different signs, or may be two lenses that have refractive powers with the same signs. The two lenses that have refractive powers with different signs mean a positive lens and a negative lens. In this case, the arrangement order of the positive lens and the negative lens does not matter. In a case where the second lens group G2 consists of two lenses that have refractive powers with different signs, there is an advantage in correcting axial chromatic aberration and lateral chromatic aberration. In a case where the second lens group G2 consists of two positive lenses, there is an advantage in correcting astigmatism due to reduction in size.

The second lens group G2 preferably has a positive refractive power as a whole. Since the second lens group G2 has a positive refractive power as a whole, there is an advantage in suppressing the occurrence of astigmatism and the occurrence of field curvature.

The third lens group G3 consists of two lenses that have refractive powers with different signs and are cemented together. That is, the third lens group G3 may be a cemented lens in which a positive lens and a negative lens are cemented together in order from the object side, or may be a cemented lens in which a negative lens and a positive lens are cemented together in order from the object side. The above configuration of the third lens group G3 is advantageous in correcting axial chromatic aberration and lateral chromatic aberration.

The third lens group G3 preferably has a positive refractive power as a whole. Since the third lens group G3 has a positive refractive power as a whole, there is an advantage in suppressing the occurrence of astigmatism and the occurrence of field curvature.

The fourth lens group G4 consists of two lenses that have refractive powers with different signs and are cemented together. That is, the fourth lens group G4 may be a cemented lens in which a positive lens and a negative lens are cemented together in order from the object side, or may be a cemented lens in which a negative lens and a positive lens are cemented together in order from the object side. The above configuration of the fourth lens group G4 is advantageous in correcting lateral chromatic aberration.

The fourth lens group G4 preferably has a positive refractive power as a whole. Since the fourth lens group G4 has a positive refractive power as a whole, there is an advantage in suppressing an increase in diameter of a lens on the image side with respect to the aperture stop St while suppressing an increase in lateral chromatic aberration.

As described above, the objective lens 1 for an endoscope consists of seven lenses and the aperture stop St. In the objective lens 1 for an endoscope shown in FIG. 1, the first lens group G1 consists of one lens L1, the second lens group G2 consists of a lens L2 and a lens L3 in order from the object side to the image side, the third lens group G3 consists of a lens L4 and a lens L5 in order from the object side to the image side, and the fourth lens group G4 consists of a lens L6 and a lens L7 in order from the object side to the image side. As an example, in the example of FIG. 1, the lens L1, the lens L3, the lens L4, and the lens L7 are negative lenses, and the lens L2, the lens L5, and the lens L6 are positive lenses.

Assuming that an Abbe number of a lens on the object side in the second lens group G2 at the d line is v2f, an Abbe number of a lens on the image side in the second lens group G2 at the d line is v2r, a distance on the optical axis Z from a lens surface on the object side in the first lens group G1 to a lens surface closest to the image side in the fourth lens group G4 is AL, and a paraxial radius of curvature of a cemented surface in the second lens group G2 is R2c, the objective lens 1 for an endoscope preferably satisfies Conditional Expression (1). By satisfying Conditional Expression (1), there is an advantage in reducing the size while suppressing excessive correction of chromatic aberration in the second lens group G2 and maintaining favorable chromatic aberration correction. By not allowing the result of Conditional Expression (1) to be equal to or less than the lower limit, an absolute value of the curvature radius of the cemented surface in the second lens group G2 can be increased, and thus, the thickness related to the curved surface of the cemented surface on the object side with respect to the aperture stop St can be reduced. Thereby, it is advantageous for reduction in size. The phrase "thickness related to the curved surface of the cemented surface" is a distance in the optical axis Z direction between a point where the cemented surface intersects the optical axis Z and a point at the effective diameter end of the cemented surface. By not allowing the result of Conditional Expression (1) to be equal to or greater than the upper limit, there is an advantage in suppressing an increase in overall length of the lens system. In order to obtain more favorable characteristics, the objective lens 1 for an endoscope more preferably satisfies Conditional Expression (1-1).

$$-300<(v2f-v2r)\times|AL/R2c|<30 \qquad (1)$$

$$-250<(v2f-v2r)\times|AL/R2c|<20 \qquad (1\text{-}1)$$

Assuming that an Abbe number of a lens on the object side in the third lens group G3 at a d line is v3f, an Abbe number of a lens on the image side in the third lens group G3 at the d line is v3r, an Abbe number of a lens on the object side in the fourth lens group G4 at the d line is v4f, an Abbe number of a lens on the image side in the fourth lens group G4 at the d line is v4r, an expression having a larger value between |v3f−v3r| and |v4f−v4r| is |vf−vr|, a focal length of a whole system is f, a distance on the optical axis Z from a lens surface on the object side in the first lens group G1 to a lens surface closest to the image side in the fourth lens group G4 is AL, and an air conversion distance on the optical axis Z from the lens surface closest to the image side in the fourth lens group G4 to a focal position on the image side of the whole system is Bf, the objective lens 1 for an endoscope preferably satisfies Conditional Expression (2). By not allowing the result of Conditional Expression (2) to be equal to or less than the lower limit, there is an advantage in correcting chromatic aberration while suppressing an increase in the overall length of the lens system. By not allowing the result of Conditional Expression (2) to be equal to or greater than the upper limit, there is an advantage in reducing the size while ensuring various performances of the objective lens 1 for an endoscope. The various performances referred to here include not only performances related to various aberrations including chromatic aberration but also performances related to specifications such as a viewing angle and a focal length. In order to obtain more favorable characteristics, the objective lens 1 for an endoscope more preferably satisfies Conditional Expression (2-1).

$$3.9 < |vf - vr| \times f/(AL + Bf) < 20 \qquad (2)$$

$$4 < |vf - vr| \times f/(AL + Bf) < 10 \qquad (2\text{-}1)$$

Assuming that a focal length of the first lens group G1 is f1, a focal length of the second lens group G2 is f2, a focal length of the third lens group G3 is f3, and a focal length of the fourth lens group G4 is f4, the objective lens 1 for an endoscope preferably satisfies Conditional Expression (3). By not allowing Conditional Expression (3) to be equal to or less than the lower limit, it is easy to suppress deviation of the refractive power of the third lens group G3 and the fourth lens group G4. As a result, there is an advantage in suppressing an increase in diameter of a lens on the image side with respect to the aperture stop St. The deviation of the refractive power of the third lens group G3 and the fourth lens group G4 referred to here means that the refractive power of one of the third lens group G3 and the fourth lens group G4 is excessively strong and the refractive power of the other is excessively weak. In addition, by not allowing the result of Conditional Expression (3) to be equal to or less than the lower limit, there is an advantage in adjusting the refractive power of a lens group on the image side with respect to the aperture stop St, and in ensuring a back focal length of an appropriate length while the objective lens 1 for an endoscope has a retrofocus configuration. By not allowing Conditional Expression (3) to be equal to or greater than the upper limit, it is easy to suppress deviation of the refractive power of the first lens group G1 and the second lens group G2. As a result, there is an advantage in suppressing an increase in diameter of a lens on the object side with respect to the aperture stop St. The deviation of the refractive power of the first lens group G1 and the second lens group G2 referred to here means that the refractive power of one of the first lens group G1 and the second lens group G2 is excessively strong and the refractive power of the other is excessively weak. In addition, by not allowing the result of Conditional Expression (3) to be equal to or greater than the upper limit, there is an advantage in ensuring a wide viewing angle. In order to obtain more favorable characteristics, the objective lens 1 for an endoscope more preferably satisfies Conditional Expression (3-1).

$$-30 < (f3 \times f4)/(f1 \times f2) < -0.2 \qquad (3)$$

$$-20 < (f3 \times f4)/(f1 \times f2) < -0.4 \qquad (3\text{-}1)$$

Assuming that a focal length of the whole system is f, a focal length of the second lens group G2 is f2, a focal length of the third lens group G3 is f3, and a focal length of the fourth lens group G4 is f4, the objective lens 1 for an endoscope preferably satisfies Conditional Expression (4). By not allowing the result of Conditional Expression (4) to be equal to or less than the lower limit, there is an advantage in maintaining the refractive power that contributes to optical performance such as a wide viewing angle and high resolution. By not allowing Conditional Expression (4) to be equal to or greater than the upper limit, it is easy to suppress deviation of the refractive power of the second lens group G2, the third lens group G3, and the fourth lens group G4. As a result, there is an advantage in suppressing an increase in overall length of the lens system. In order to obtain more favorable characteristics, the objective lens 1 for an endoscope more preferably satisfies Conditional Expression (4-1).

$$10 < (f2 \times f3 \times f4)/(f \times f \times f) < 300 \qquad (4)$$

$$30 < (f2 \times f3 \times f4)/(f \times f \times f) < 200 \qquad (4\text{-}1)$$

Assuming that a distance on the optical axis Z from a lens surface on the object side in the first lens group G1 to a lens surface closest to the image side in the fourth lens group G4 is AL, and an air conversion distance on the optical axis Z from the lens surface closest to the image side in the fourth lens group G4 to a focal position on the image side of the whole system is Bf, the objective lens 1 for an endoscope preferably satisfies Conditional Expression (5). By not allowing the result of Conditional Expression (5) to be equal to or less than the lower limit, there is an advantage in obtaining favorable resolution performance. As shown in FIG. 1, in a case where the objective lens 1 for an endoscope is used in combination with the imaging element 5, various filters are often disposed between the objective lens 1 for an endoscope and the imaging element 5. For this reason, a back focal length that is somewhat long is often required. Further, in a type in which the imaging surface of the imaging element 5 is disposed in parallel with the major axis direction of an insertion part of the endoscope as shown in FIG. 1, since an optical path deflecting member such as the prism Pr for deflecting an optical path is generally inserted and disposed between the lens system and the imaging element 5, a sufficiently long back focal length is often required. By not allowing the result of Conditional Expression (5) to be equal to or greater than the upper limit, there is an advantage in ensuring a sufficiently long back focal length required in the disposition. In order to obtain more favorable characteristics, the objective lens 1 for an endoscope more preferably satisfies Conditional Expression (5-1).

$$1 < AL/Bf < 4 \qquad (5)$$

$$2.2 < AL/Bf < 3 \qquad (5\text{-}1)$$

Assuming that a distance on the optical axis Z from the lens surface on the object side in the first lens group G1 to the aperture stop St is Df, a distance on the optical axis Z from the aperture stop St to the lens surface closest to the image side in the fourth lens group G4 is Dr, and a distance on the optical axis Z from the lens surface on the object side in the first lens group G1 to the lens surface closest to the image side in the fourth lens group G4 is AL, the objective lens 1 for an endoscope preferably satisfies Conditional Expression (6). By satisfying Conditional Expression (6), it is easy to maintain a balance between the length of the lens system on the object side of the aperture stop St and the length of the lens system on the image side of the aperture stop St. Thereby, it is possible to reduce size deviation of the lens system in the optical axis Z direction and the radial direction on the object side of the aperture stop St and the image side of the aperture stop St. As a result, it is possible to contribute to reducing the size. In order to obtain more favorable characteristics, the objective lens 1 for an endoscope more preferably satisfies Conditional Expression (6-1). By not allowing the result of Conditional Expression (6-1) to be equal to or less than the lower limit, there is an advantage in suppressing an increase in overall length of the lens system while maintaining optical performance such as a wide viewing angle and high resolution.

$$|Df-Dr|/AL<1 \qquad (6)$$

$$0.01<|Df-Dr|/AL<0.15 \qquad (6\text{-}1)$$

Assuming that a focal length of the third lens group G3 is f3, and a focal length of the fourth lens group G4 is f4, the objective lens 1 for an endoscope preferably satisfies Conditional Expression (7). By satisfying Conditional Expression (7), it is easy to suppress deviation of the refractive power of the third lens group G3 and the fourth lens group G4. As a result, there is an advantage in suppressing an increase in diameter of a lens on the image side with respect to the aperture stop St. In order to obtain more favorable characteristics, the objective lens 1 for an endoscope more preferably satisfies Conditional Expression (7-1). By not allowing the result of Conditional Expression (7-1) to be equal to or less than the lower limit, it is possible to satisfactorily adjust the refractive power of the third lens group G3 and the fourth lens group G4. As a result, there is an advantage in suppressing the occurrence of astigmatism and the occurrence of field curvature.

$$f4/f3<5 \qquad (7)$$

$$0.3<f4/f3<3 \qquad (7\text{-}1)$$

Assuming that a thickness of the second lens group G2 on the optical axis Z is Dc2, and a thickness of the fourth lens group G4 on the optical axis Z is Dc4, the objective lens 1 for an endoscope preferably satisfies Conditional Expression (8). The thickness of the second lens group G2 on the optical axis Z is a distance on the optical axis Z from a lens surface closest to the object side in the second lens group G2 to a lens surface closest to the image side in the second lens group G2. Similarly, the thickness of the fourth lens group G4 on the optical axis Z is a distance on the optical axis Z from a lens surface closest to the object side in the fourth lens group G4 to a lens surface closest to the image side in the fourth lens group G4. By satisfying Conditional Expression (8), there is an advantage in suppressing an increase in length of the lens system on the image side with respect to the aperture stop St in the optical axis Z direction. In order to obtain more favorable characteristics, the objective lens 1 for an endoscope more preferably satisfies Conditional Expression (8-1). By not allowing the result of Conditional Expression (8-1) to be equal to or less than the lower limit, there is an advantage in suppressing an increase in length of the lens system on the object side with respect to the aperture stop St in the optical axis Z direction.

$$Dc4/Dc2<1.2 \qquad (8)$$

$$0.5<Dc4/Dc2<1 \qquad (8\text{-}1)$$

Although the prism Pr is used as the optical path deflecting member in FIG. 1, the optical path deflecting member is not limited to the prism Pr and may be a mirror, a diffractive optical element, or the like. In addition, the angle at which the optical path is bent may be an angle other than a vertical angle.

The above-mentioned preferred configurations and possible configurations including those related to the conditional expressions can be any combination, and are preferably selectively employed in accordance with required specifications. The range of possible conditional expressions is not limited to the conditional expressions described in the form of expressions, and includes a range obtained by optionally combining the lower limit and the upper limit from among the preferred and more preferred conditional expressions.

Two preferred aspects of the objective lens 1 for an endoscope will be described below. In a first aspect, the objective lens 1 for an endoscope consists of, in order from the object side to the image side, the first lens group G1 consisting of one negative lens, the second lens group G2 consisting of two lenses cemented together, the aperture stop St, the third lens group G3 consisting of two lenses that have refractive powers with different signs and are cemented together, and the fourth lens group G4 consisting of two lenses that have refractive powers with different signs and are cemented together, and satisfies Conditional Expression (1).

In a second aspect, the objective lens 1 for an endoscope consists of, in order from the object side to the image side, the first lens group G1 consisting of one negative lens, the second lens group G2 consisting of two lenses cemented together, the aperture stop St, the third lens group G3 consisting of two lenses that have refractive powers with different signs and are cemented together, and the fourth lens group G4 consisting of two lenses that have refractive powers with different signs and are cemented together, and satisfies Conditional Expression (2).

Next, examples of the objective lens for an endoscope according to the present disclosure will be described.

Example 1

Figure 2:
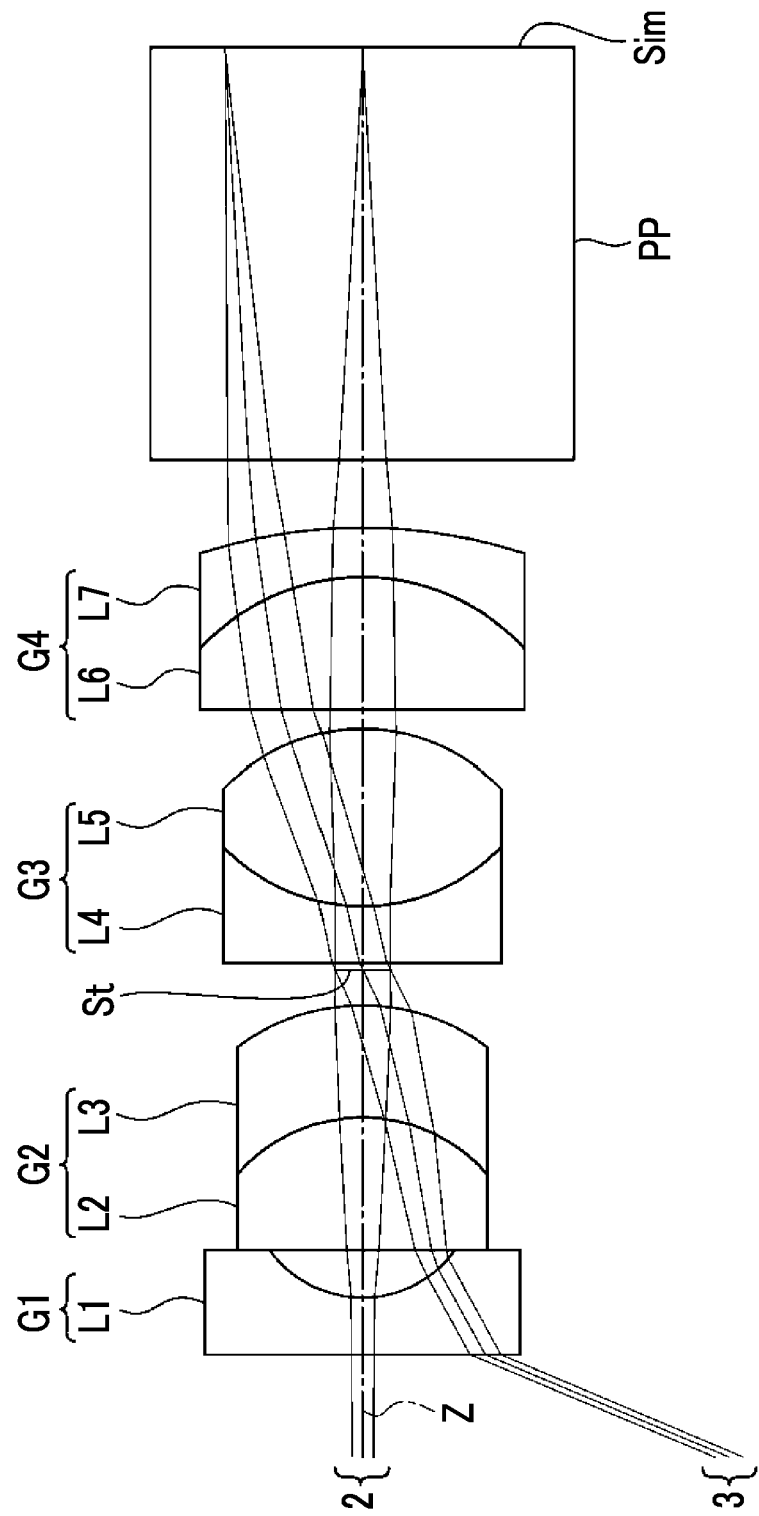
FIG. 2 is a cross-sectional view showing a configuration and rays of an objective lens for an endoscope according to Example 1.

FIG. 2 shows a cross-sectional view showing the configuration and rays of an objective lens for an endoscope according to Example 1. In FIG. 2, the left side is an object side and the right side is an image side, and on-axis rays 2 and rays with the maximum angle of view 3 are shown as rays. FIG. 2 shows a view in which an optical system is developed so that an optical path from an objective lens for an endoscope to an image plane Sim is linear for easy understanding. An optical member PP in FIG. 2 includes at least one of an optical path deflecting member, various filters, or a cover glass. In the optical axis Z direction, the position of the surface of the optical member PP on the image side is the position of the image plane Sim. An aperture stop St in FIG. 2 does not indicate the shape, and indicates the position in an optical axis Z direction.

The objective lens for an endoscope according to Example 1 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a positive lens and a lens L3 which is a negative lens in order from the object side to the image side. The third lens group G3 consists of a cemented lens formed by cementing a lens L4 which is a negative lens and a lens L5 which is a positive lens in order from the object side to the image side. The fourth lens group G4 consists of a cemented lens formed by cementing a lens L6 which is a positive lens and a lens L7 which is a negative lens in order from the object side to the image side. The phrase "first lens group G1 having a negative refractive power" means that the first lens group G1 as a whole has a negative refractive power. Similarly, the phrase "second lens group G2 having a positive refractive power" means that the second lens group G2 as a whole has a positive refractive power. The same applies to the phrase "third lens group G3 having a positive refractive power" and the phrase "fourth lens group G4 having a positive refractive power".

Table 1 shows basic lens data of the objective lens for an endoscope according to Example 1, and Table 2 shows a specification thereof. In Table 1, the column of Sn shows surface numbers in a case where the surface closest to the object side is the first surface and the surface numbers increase one by one toward the image side, the column of R shows radii of curvature of the respective surfaces, and the column of D shows surface distances on the optical axis Z between the respective surfaces and the surface adjacent to the image side. The column of Nd shows refractive indices of the respective components at the d line, and the column of νd shows Abbe numbers of the respective components at the d line.

In Table 1, signs of radii of curvature of surface shapes convex toward the object side are set to be positive, and signs of radii of curvature of surface shapes convex toward the image side are set to be negative. Table 1 also shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image side in the table.

Table 2 shows values of the focal length f, the back focal length at an air conversion distance, the F number FNo., and the maximum total angle of view 2ω of the objective lens for an endoscope. In the description of the examples, the viewing angle is represented as the angle of view. (°) in the place of 2ω indicates that the unit thereof is a degree. Table 2 shows each value on the d line basis.

Each table shown below shows numerical values rounded off to predetermined decimal places. Note that all the data of the examples shown in the following description are data in a case where the focal length of the objective lens for an endoscope is standardized to be 1.00. The optical system can be used even though the system is enlarged or reduced in proportion.

TABLE 1

Example 1

| Sn | R | D | Nd | νd |
|---|---|---|---|---|
| 1 | ∞ | 0.4151 | 1.88300 | 40.95 |
| 2 | 0.8610 | 0.3459 | | |
| 3 | ∞ | 0.9685 | 1.80518 | 25.46 |
| 4 | −1.2578 | 0.8185 | 1.59522 | 67.73 |
| 5 | −1.5718 | 0.2591 | | |
| 6(St) | ∞ | 0.0484 | | |
| 7 | ∞ | 0.4151 | 1.95375 | 32.32 |
| 8 | 1.4564 | 1.2867 | 1.49700 | 81.61 |
| 9 | −1.4564 | 0.1384 | | |
| 10 | ∞ | 0.9685 | 2.00100 | 29.13 |
| 11 | −1.6670 | 0.3597 | 1.94595 | 17.98 |
| 12 | −4.0092 | 0.4987 | | |
| 13 | ∞ | 3.0093 | 1.55920 | 53.92 |
| 14 | ∞ | 0.0000 | | |

TABLE 2

Example 1

| f | 1.00 |
|---|---|
| Bf | 2.34 |
| FNo. | 5.42 |
| 2ω(°) | 135.4 |

Figure 3:
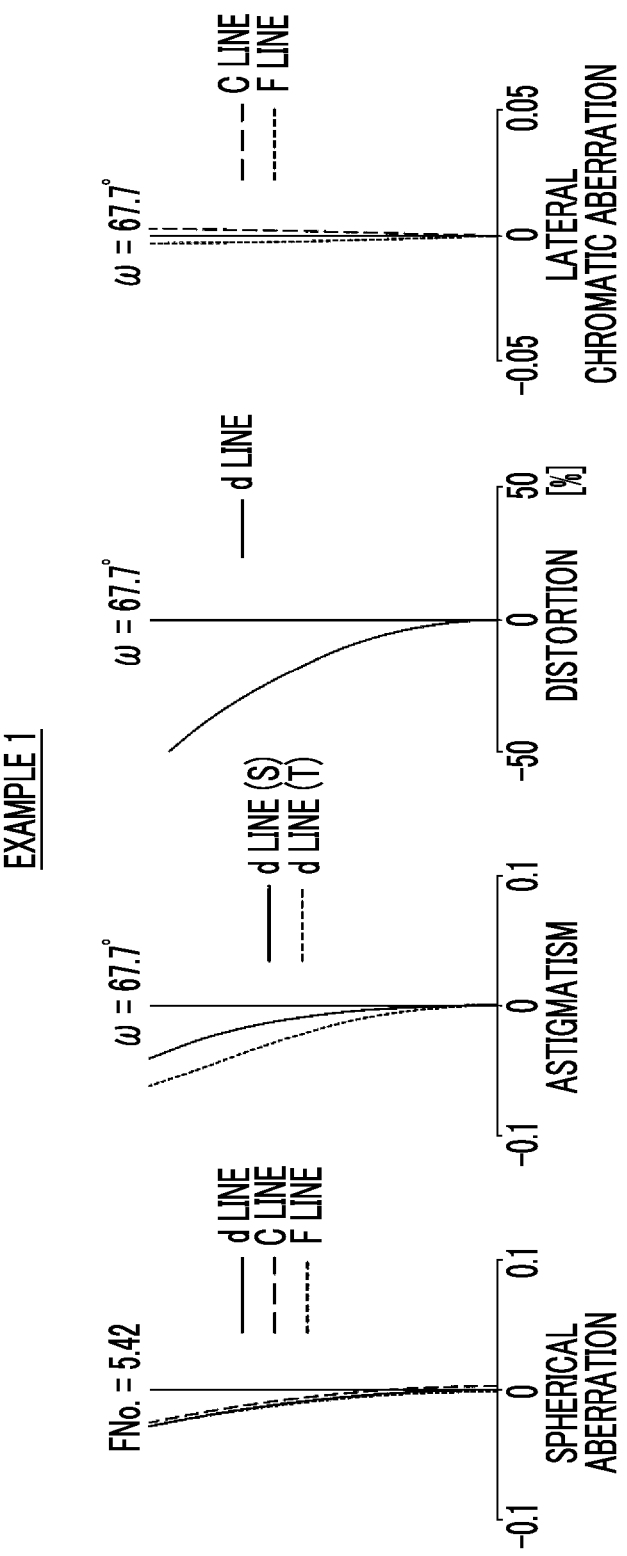
FIG. 3 is a diagram of aberrations of the objective lens for an endoscope according to Example 1.

FIG. 3 shows a diagram of aberrations of the objective lens for an endoscope according to Example 1 in a case where the object distance is 10.1. The object distance is a distance on the optical axis Z from the object to the surface of the lens L1 on the object side. In FIG. 3, in order from the left side, a spherical aberration diagram, an astigmatism diagram, a distortion diagram, and a lateral chromatic aberration diagram are shown. In the spherical aberration diagram, aberrations at the d line, the C line, and the F line are indicated by a solid line, a long dashed line, and a short dashed line, respectively. In the astigmatism diagram, aberration at the d line in the sagittal direction is indicated by a solid line, and aberration at the d line in the tangential direction is indicated by a short dashed line. In the distortion diagram, aberration at the d line is indicated by a solid line. In the lateral chromatic aberration diagram, aberrations at the C line and the F line are respectively indicated by a long dashed line and a short dashed line. In the spherical aberration diagram, FNo. indicates an F number. In the other aberration diagrams, ω indicates a half angle of view. In FIG. 3, values of FNo. and ω corresponding to the upper part in the vertical axis of each diagram are described.

Symbols, meanings, description methods, and illustration methods of the respective data pieces relating to Example 1 are the same as those in the following examples unless otherwise noted. Therefore, in the following description, repeated description will be omitted.

Example 2

Figure 4:
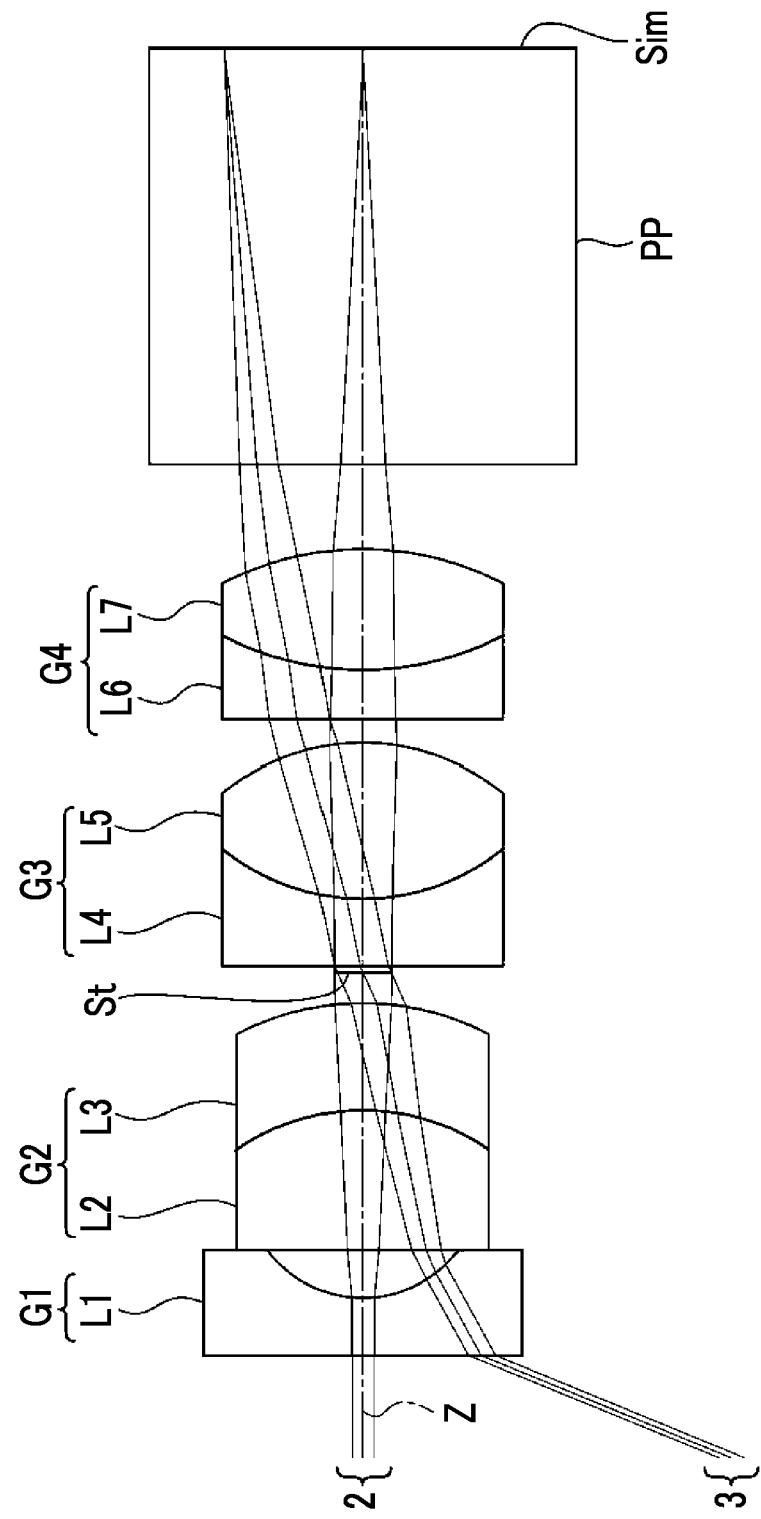
FIG. 4 is a cross-sectional view showing a configuration and rays of an objective lens for an endoscope according to Example 2.

FIG. 4 shows a cross-sectional view showing the configuration and rays of an objective lens for an endoscope according to Example 2. The objective lens for an endoscope according to Example 2 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a positive lens and a lens L3 which is a positive lens in order from the object side to the image side. The third lens group G3 consists of a cemented lens formed by cementing a lens L4 which is a negative lens and a lens L5 which is a positive lens in order from the object side to the image side. The fourth lens group G4 consists of a cemented lens formed by cementing a lens L6 which is a negative lens and a lens L7 which is a positive lens in order from the object side to the image side.

Figure 5:
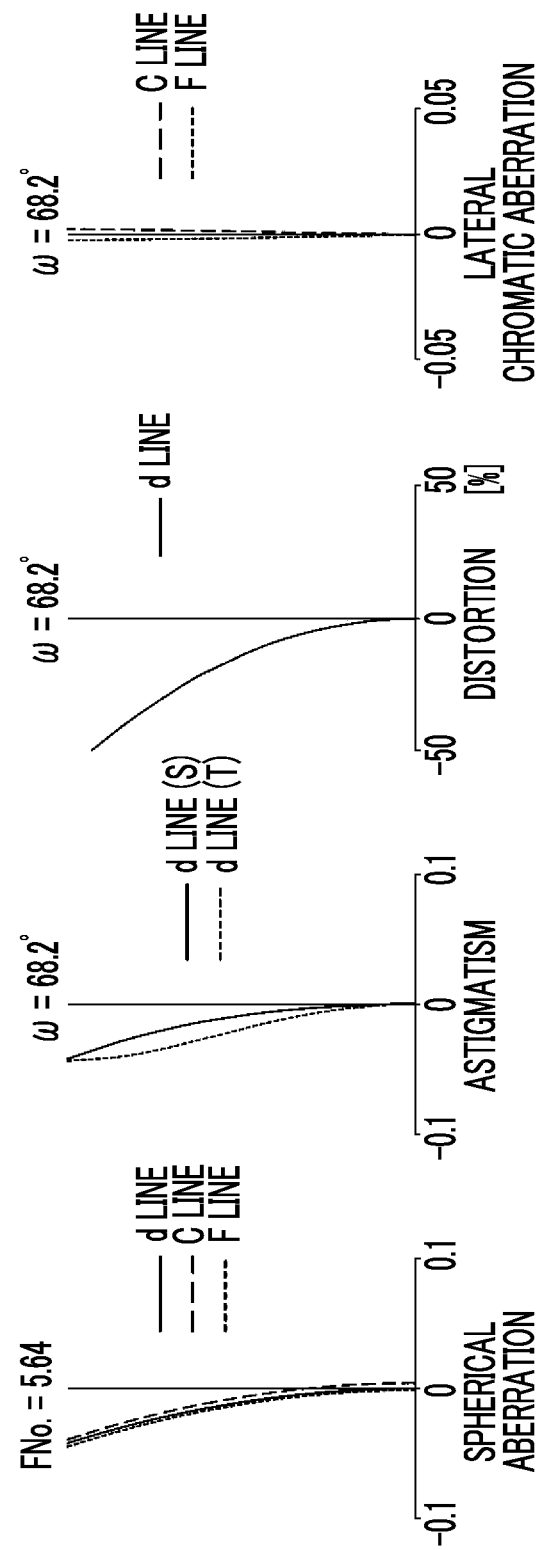
FIG. 5 is a diagram of aberrations of the objective lens for an endoscope according to Example 2.

Table 3 shows basic lens data of the objective lens for an endoscope according to Example 2, Table 4 shows a specification thereof, and FIG. 5 shows a diagram of aberrations in a case where the object distance is 10.1.

TABLE 3

Example 2

| Sn | R | D | Nd | vd |
|---|---|---|---|---|
| 1 | ∞ | 0.4150 | 1.88300 | 40.95 |
| 2 | 0.8911 | 0.3458 | | |
| 3 | ∞ | 1.0097 | 1.80518 | 25.46 |
| 4 | −1.6782 | 0.7746 | 1.95375 | 32.32 |
| 5 | −2.0321 | 0.2213 | | |
| 6(St) | ∞ | 0.0484 | | |
| 7 | ∞ | 0.4841 | 2.00100 | 29.13 |
| 8 | 1.6782 | 1.1204 | 1.64769 | 33.79 |
| 9 | −1.6782 | 0.1660 | | |
| 10 | ∞ | 0.3596 | 1.92286 | 20.88 |
| 11 | 2.2972 | 0.8714 | 1.69680 | 55.53 |
| 12 | −2.2972 | 0.6128 | | |
| 13 | ∞ | 3.0085 | 1.55920 | 53.92 |
| 14 | ∞ | 0.0000 | | |

TABLE 4

Example 2

| f | 1.00 |
|---|---|
| Bf | 2.45 |
| FNo. | 5.64 |
| 2ω(°) | 136.4 |

Example 3

Figure 6:
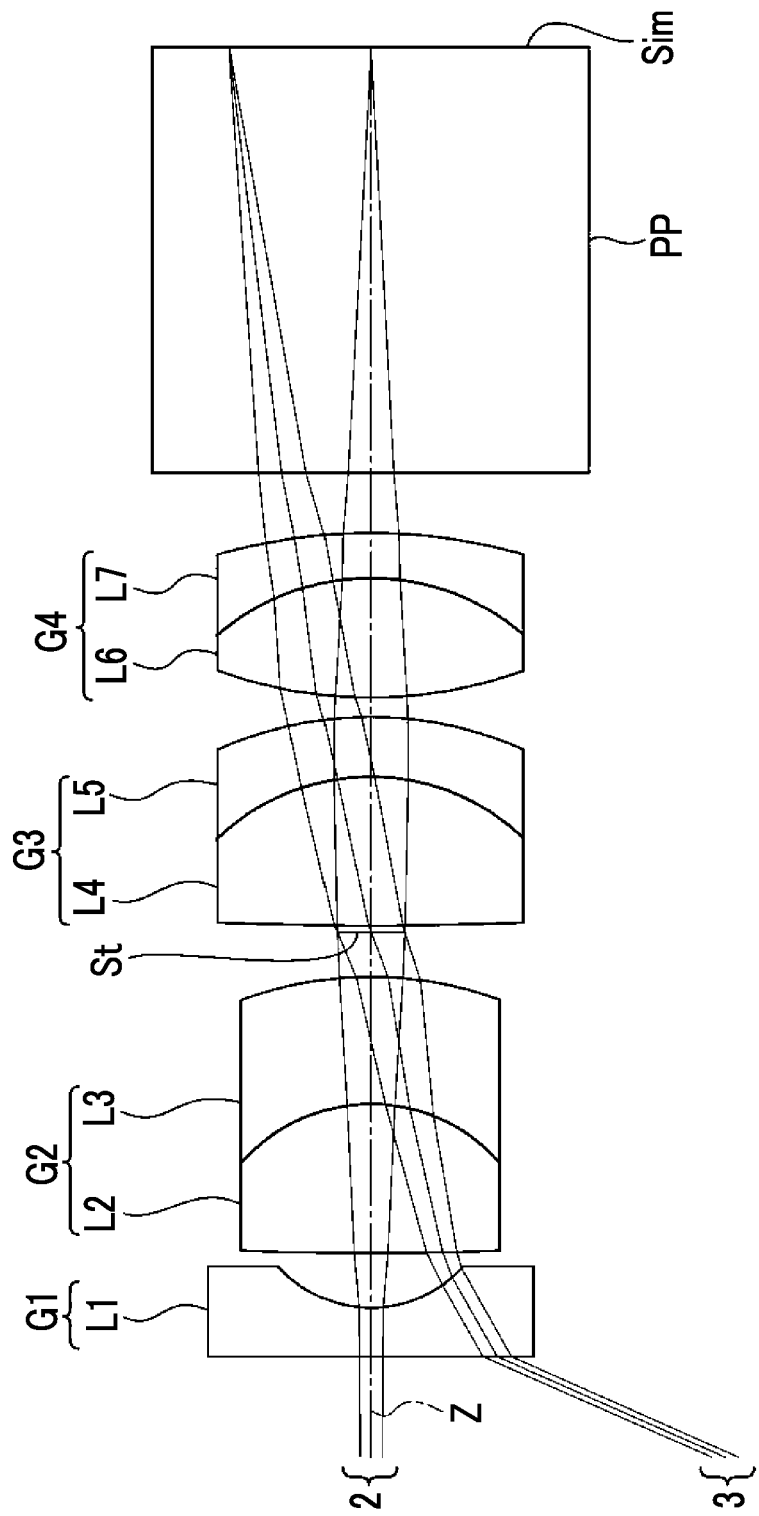
FIG. 6 is a cross-sectional view showing a configuration and rays of an objective lens for an endoscope according to Example 3.

FIG. 6 shows a cross-sectional view showing the configuration and rays of an objective lens for an endoscope according to Example 3. The objective lens for an endoscope according to Example 3 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a positive lens and a lens L3 which is a negative lens in order from the object side to the image side. The third lens group G3 consists of a cemented lens formed by cementing a lens L4 which is a positive lens and a lens L5 which is a negative lens in order from the object side to the image side. The fourth lens group G4 consists of a cemented lens formed by cementing a lens L6 which is a positive lens and a lens L7 which is a negative lens in order from the object side to the image side.

Figure 7:
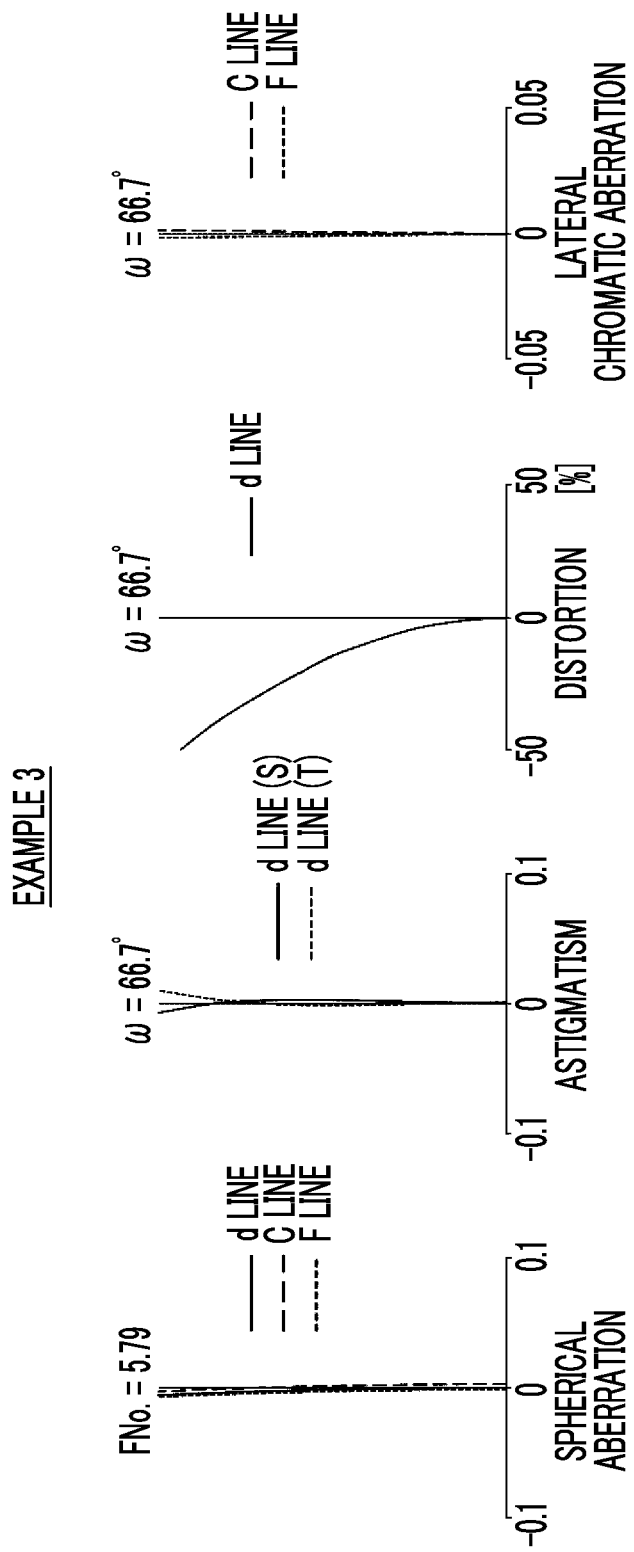
FIG. 7 is a diagram of aberrations of the objective lens for an endoscope according to Example 3.

Table 5 shows basic lens data of the objective lens for an endoscope according to Example 3, Table 6 shows a specification thereof, and FIG. 7 shows a diagram of aberrations in a case where the object distance is 9.6.

TABLE 5

Example 3

| Sn | R | D | Nd | vd |
|---|---|---|---|---|
| 1 | ∞ | 0.3276 | 1.83006 | 44.99 |
| 2 | 0.8651 | 0.3670 | | |
| 3 | 27.0835 | 0.9961 | 1.66701 | 32.36 |
| 4 | −1.1915 | 0.8519 | 1.91038 | 36.96 |
| 5 | −2.6212 | 0.2987 | | |
| 6(St) | ∞ | 0.0459 | | |

TABLE 5-continued

Example 3

| Sn | R | D | Nd | vd |
|---|---|---|---|---|
| 7 | 26.2128 | 0.9961 | 1.69474 | 48.91 |
| 8 | −1.5419 | 0.3932 | 1.41999 | 70.00 |
| 9 | −2.6213 | 0.1311 | | |
| 10 | 3.1420 | 0.7995 | 1.54471 | 73.12 |
| 11 | −1.6383 | 0.3014 | 1.99999 | 18.55 |
| 12 | −3.8808 | 0.4047 | | |
| 13 | ∞ | 2.8506 | 1.55920 | 53.92 |
| 14 | ∞ | 0.0000 | | |

TABLE 6

Example 3

| f | 1.00 |
|---|---|
| Bf | 2.13 |
| FNo. | 5.79 |
| 2ω(°) | 133.4 |

Example 4

Figure 8:
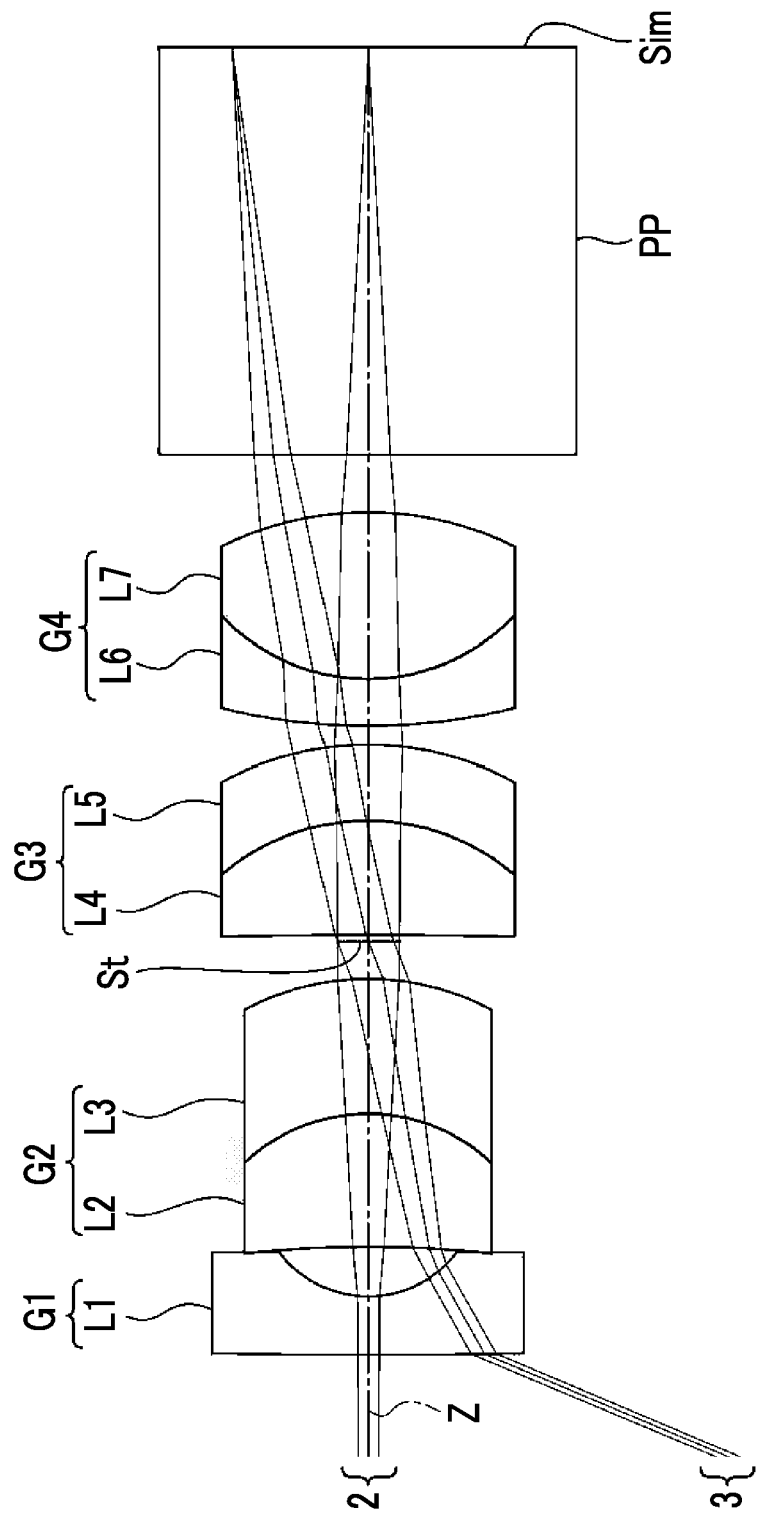
FIG. 8 is a cross-sectional view showing a configuration and rays of an objective lens for an endoscope according to Example 4.

FIG. 8 shows a cross-sectional view showing the configuration and rays of an objective lens for an endoscope according to Example 4. The objective lens for an endoscope according to Example 4 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a positive lens and a lens L3 which is a negative lens in order from the object side to the image side. The third lens group G3 consists of a cemented lens formed by cementing a lens L4 which is a positive lens and a lens L5 which is a negative lens in order from the object side to the image side. The fourth lens group G4 consists of a cemented lens formed by cementing a lens L6 which is a negative lens and a lens L7 which is a positive lens in order from the object side to the image side.

Figure 9:
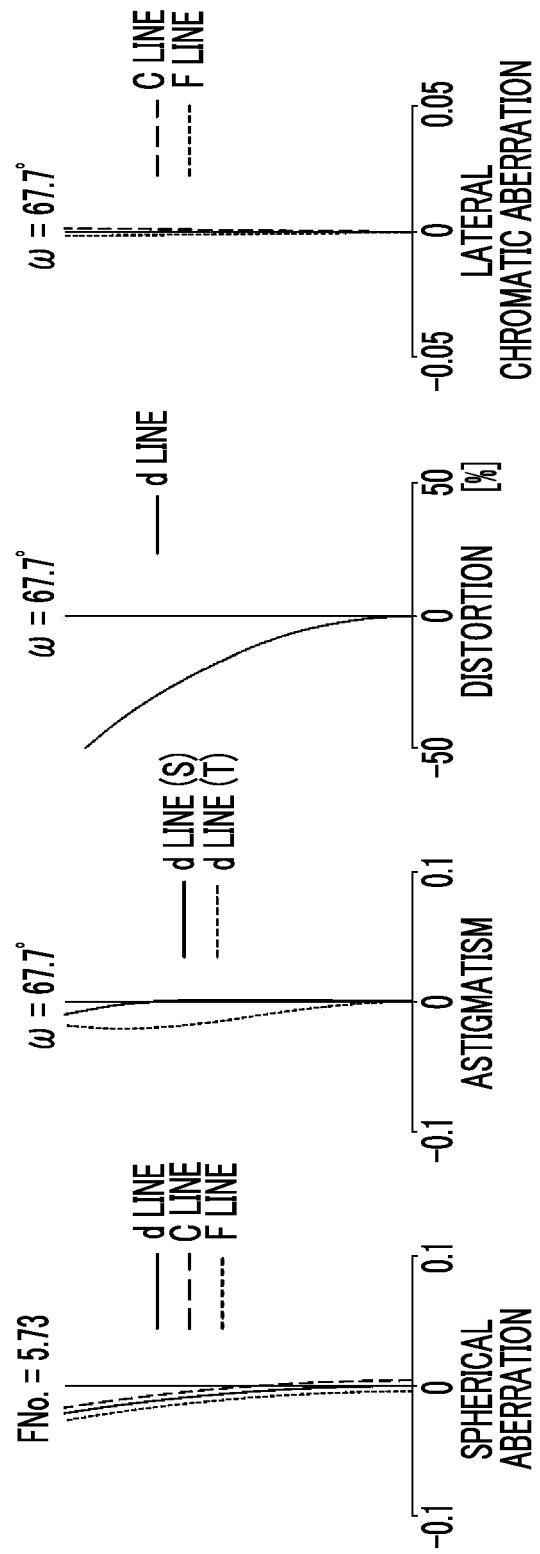
FIG. 9 is a diagram of aberrations of the objective lens for an endoscope according to Example 4.

Table 7 shows basic lens data of the objective lens for an endoscope according to Example 4, Table 8 shows a specification thereof, and FIG. 9 shows a diagram of aberrations in a case where the object distance is 10.1.

TABLE 7

Example 4

| Sn | R | D | Nd | vd |
|---|---|---|---|---|
| 1 | 96.9417 | 0.4293 | 1.87627 | 40.37 |
| 2 | 0.8527 | 0.3670 | | |
| 3 | −8.8396 | 0.9832 | 1.83769 | 23.12 |
| 4 | −1.3849 | 0.9971 | 1.92326 | 35.67 |
| 5 | −2.0269 | 0.2770 | | |
| 6(St) | ∞ | 0.0485 | | |
| 7 | −51.6758 | 0.8447 | 1.64553 | 59.22 |
| 8 | −1.7311 | 0.5539 | 2.01162 | 26.37 |
| 9 | −2.3964 | 0.1385 | | |
| 10 | 4.6969 | 0.3462 | 2.02196 | 25.69 |
| 11 | 1.5388 | 1.2325 | 1.60940 | 63.17 |
| 12 | −2.5645 | 0.4270 | | |

TABLE 7-continued

Example 4

| Sn | R | D | Nd | vd |
|---|---|---|---|---|
| 13 | ∞ | 3.0121 | 1.55920 | 53.92 |
| 14 | ∞ | 0.0000 | | |

TABLE 8

Example 4

| | |
|---|---|
| f | 1.00 |
| Bf | 2.27 |
| FNo. | 5.73 |
| 2ω(°) | 135.4 |

Example 5

Figure 10:
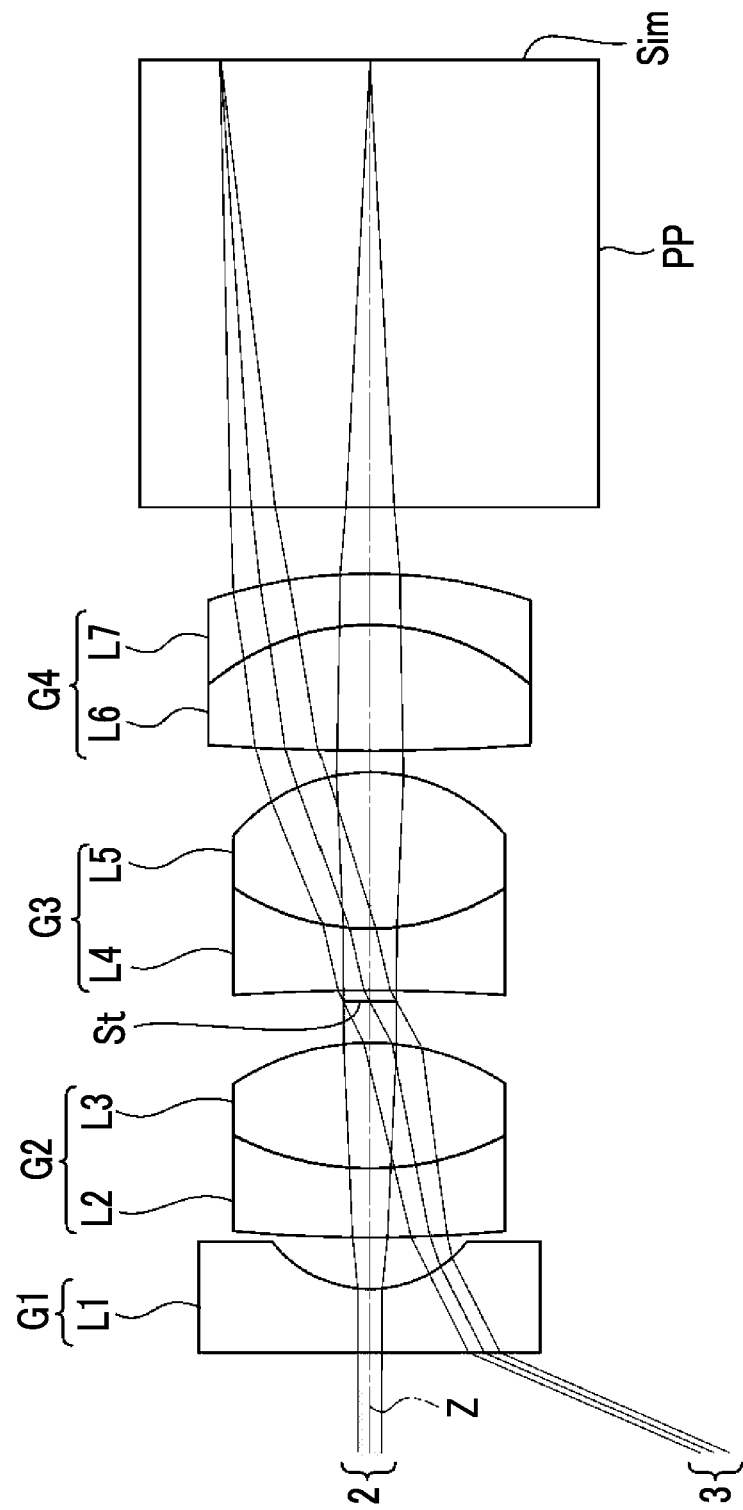
FIG. 10 is a cross-sectional view showing a configuration and rays of an objective lens for an endoscope according to Example 5.

FIG. 10 shows a cross-sectional view showing the configuration and rays of an objective lens for an endoscope according to Example 5. The objective lens for an endoscope according to Example 5 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a negative lens and a lens L3 which is a positive lens in order from the object side to the image side. The third lens group G3 consists of a cemented lens formed by cementing a lens L4 which is a negative lens and a lens L5 which is a positive lens in order from the object side to the image side. The fourth lens group G4 consists of a cemented lens formed by cementing a lens L6 which is a positive lens and a lens L7 which is a negative lens in order from the object side to the image side.

Figure 11:
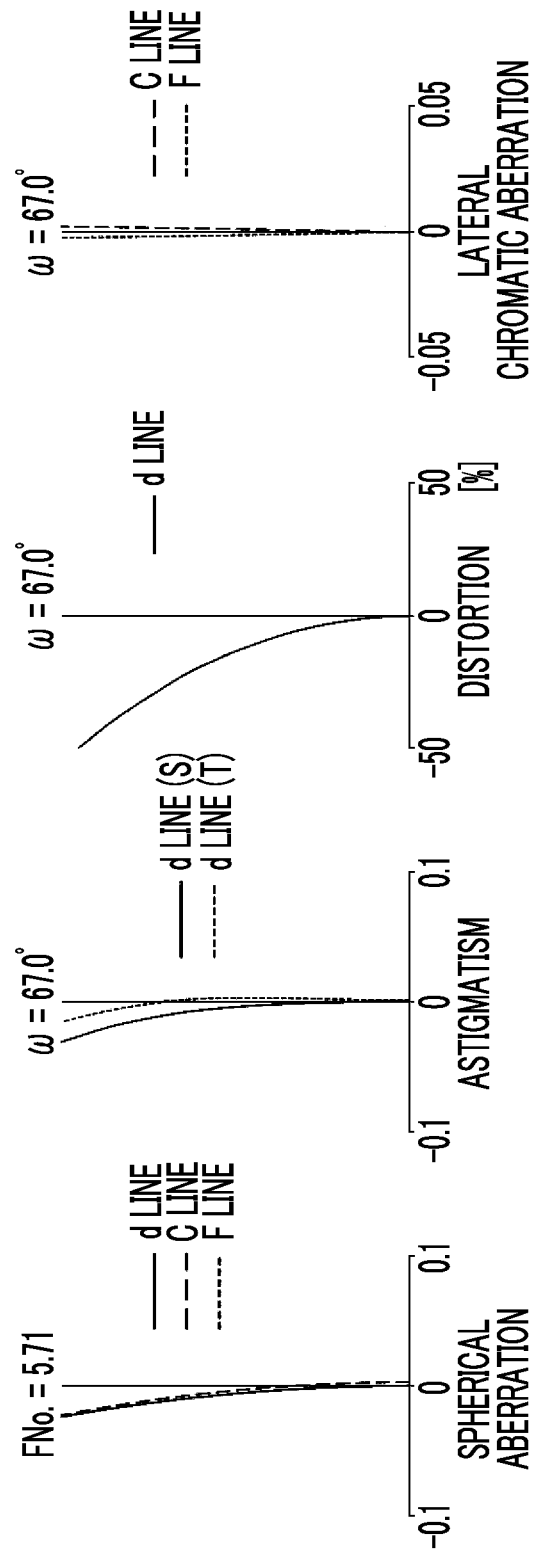
FIG. 11 is a diagram of aberrations of the objective lens for an endoscope according to Example 5.

Table 9 shows basic lens data of the objective lens for an endoscope according to Example 5, Table 10 shows a specification thereof, and FIG. 11 shows a diagram of aberrations in a case where the object distance is 10.1.

TABLE 9

Example 5

| Sn | R | D | Nd | vd |
|---|---|---|---|---|
| 1 | ∞ | 0.4292 | 2.00100 | 29.13 |
| 2 | 0.8666 | 0.3461 | | |
| 3 | 10.1771 | 0.4646 | 1.99999 | 21.50 |
| 4 | 2.0746 | 0.8445 | 1.94779 | 17.61 |
| 5 | −1.7349 | 0.2769 | | |
| 6(St) | ∞ | 0.0762 | | |
| 7 | −13.8444 | 0.4154 | 2.05001 | 20.90 |
| 8 | 1.7307 | 1.0522 | 1.50688 | 78.94 |
| 9 | −1.2452 | 0.1384 | | |
| 10 | 16.3244 | 0.8445 | 1.92967 | 35.03 |
| 11 | −1.7307 | 0.3461 | 2.05001 | 20.90 |
| 12 | −3.4853 | 0.4462 | | |
| 13 | ∞ | 3.0114 | 1.55920 | 53.92 |
| 14 | ∞ | 0.0000 | | |

TABLE 10

Example 5

| | |
|---|---|
| f | 1.00 |
| Bf | 2.28 |
| FNo. | 5.71 |
| 2ω(°) | 134.0 |

Example 6

Figure 12:
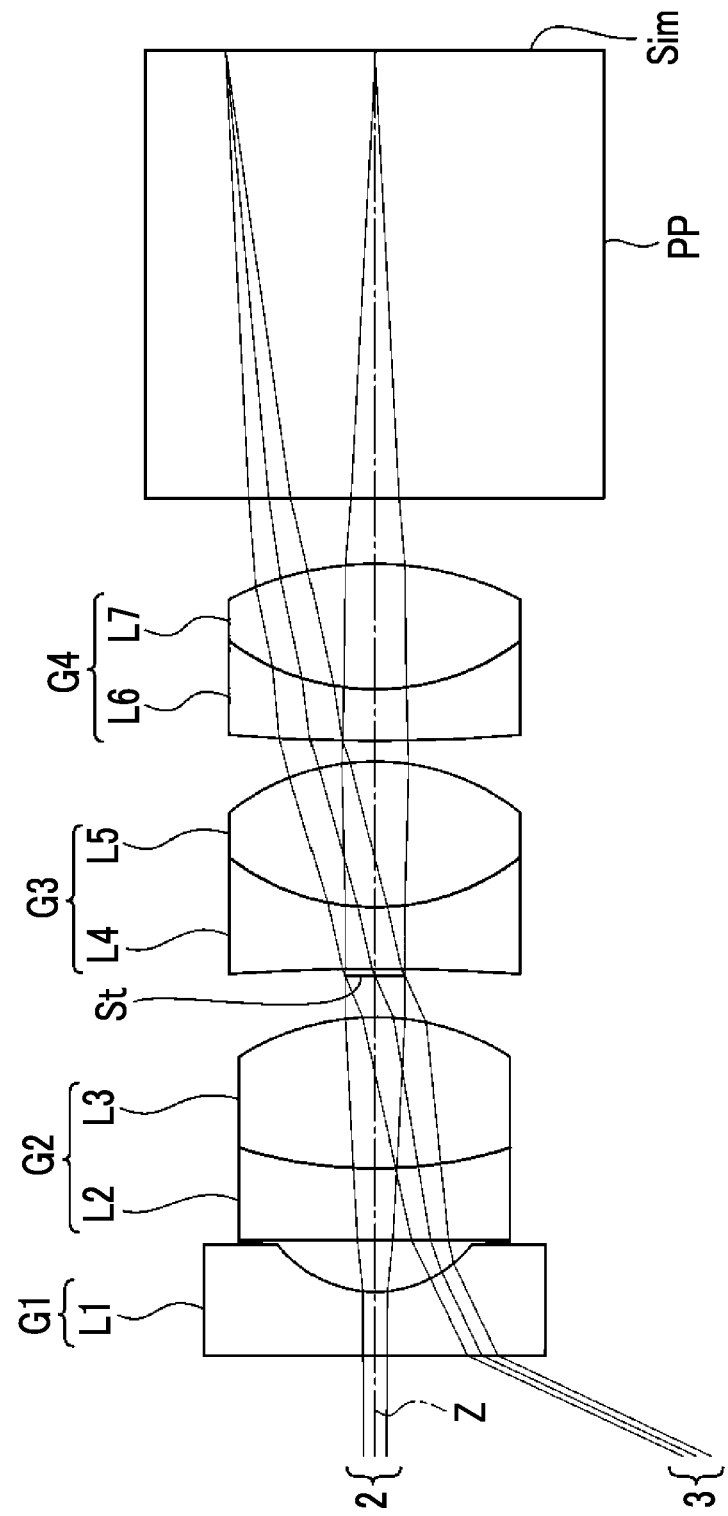
FIG. 12 is a cross-sectional view showing a configuration and rays of an objective lens for an endoscope according to Example 6.

FIG. 12 shows a cross-sectional view showing the configuration and rays of an objective lens for an endoscope according to Example 6. The objective lens for an endoscope according to Example 6 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a negative lens and a lens L3 which is a positive lens in order from the object side to the image side. The third lens group G3 consists of a cemented lens formed by cementing a lens L4 which is a negative lens and a lens L5 which is a positive lens in order from the object side to the image side. The fourth lens group G4 consists of a cemented lens formed by cementing a lens L6 which is a negative lens and a lens L7 which is a positive lens in order from the object side to the image side.

Figure 13:
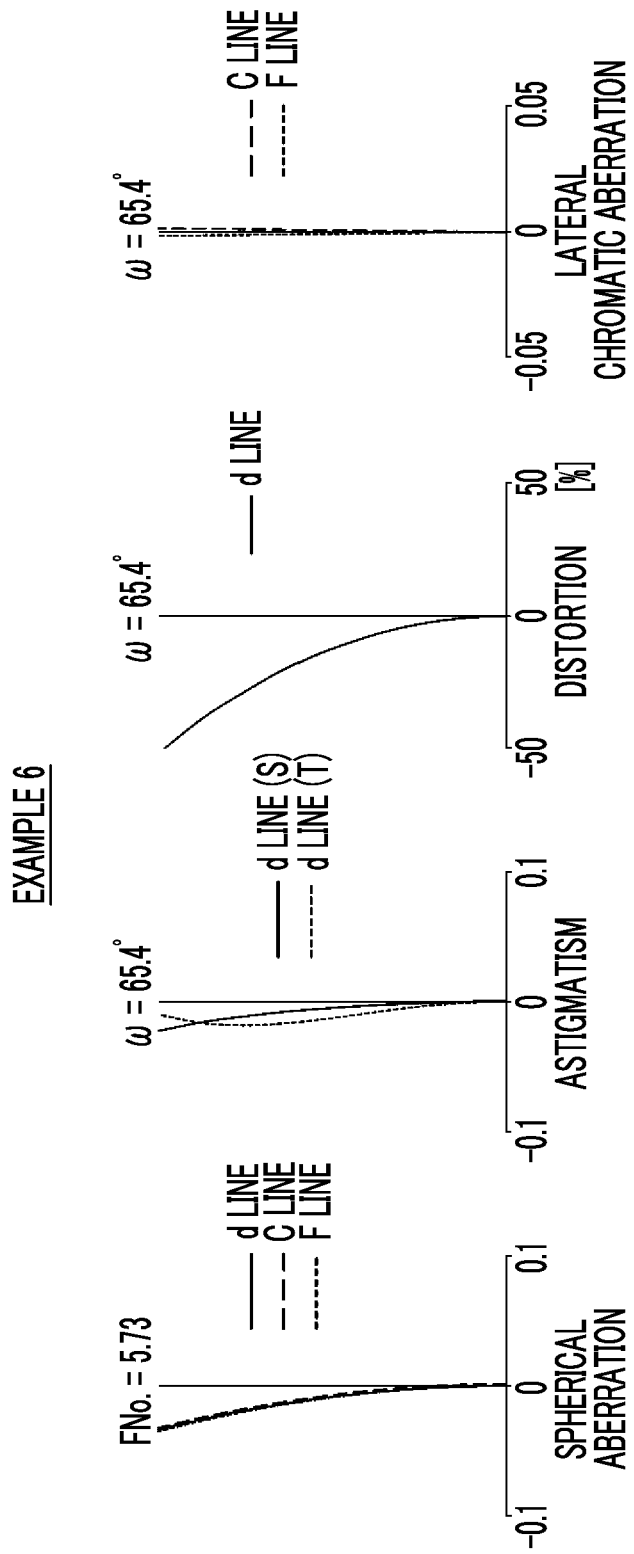
FIG. 13 is a diagram of aberrations of the objective lens for an endoscope according to Example 6.

Table 11 shows basic lens data of the objective lens for an endoscope according to Example 6, Table 12 shows a specification thereof, and FIG. 13 shows a diagram of aberrations in a case where the object distance is 10.1.

TABLE 11

Example 6

| Sn | R | D | Nd | vd |
|---|---|---|---|---|
| 1 | ∞ | 0.4293 | 2.05090 | 26.94 |
| 2 | 0.8651 | 0.3462 | | |
| 3 | −63.6381 | 0.4847 | 2.00001 | 27.35 |
| 4 | 3.1984 | 1.0108 | 2.00000 | 20.69 |
| 5 | −1.7738 | 0.2770 | | |
| 6(St) | ∞ | 0.0485 | | |
| 7 | −13.8470 | 0.4154 | 1.83613 | 33.79 |
| 8 | 1.6626 | 0.9831 | 1.57676 | 68.19 |
| 9 | −1.6291 | 0.1385 | | |
| 10 | 12.6805 | 0.3462 | 2.02973 | 25.03 |
| 11 | 1.7169 | 0.8446 | 1.71702 | 55.65 |
| 12 | −2.2287 | 0.4402 | | |
| 13 | ∞ | 3.0118 | 1.55920 | 53.92 |
| 14 | ∞ | 0.0000 | | |

TABLE 12

Example 6

| | |
|---|---|
| f | 1.00 |
| Bf | 2.28 |
| FNo. | 5.73 |
| 2ω(°) | 130.8 |

Example 7

Figure 14:
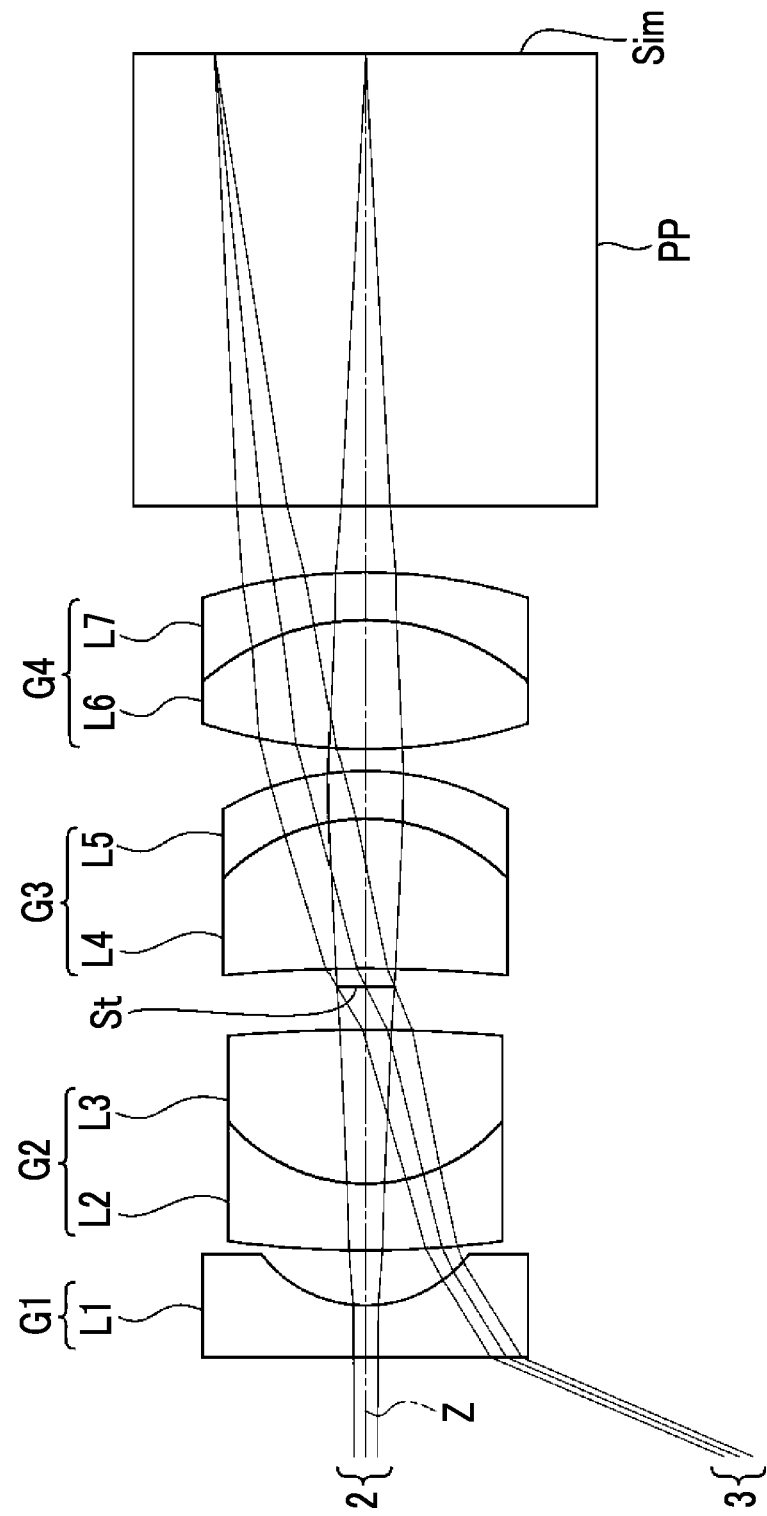
FIG. 14 is a cross-sectional view showing a configuration and rays of an objective lens for an endoscope according to Example 7.

FIG. 14 shows a cross-sectional view showing the configuration and rays of an objective lens for an endoscope according to Example 7. The objective lens for an endoscope according to Example 7 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a negative lens and a lens L3 which is a positive lens in order from the object side to the image side. The third lens group G3 consists of a cemented lens formed by cementing a lens L4 which is a positive lens and a lens L5 which is a negative lens in order from the object side to the image side. The fourth lens group G4 consists of a cemented lens formed by cementing a lens L6 which is a positive lens and a lens L7 which is a negative lens in order from the object side to the image side.

Figure 15:
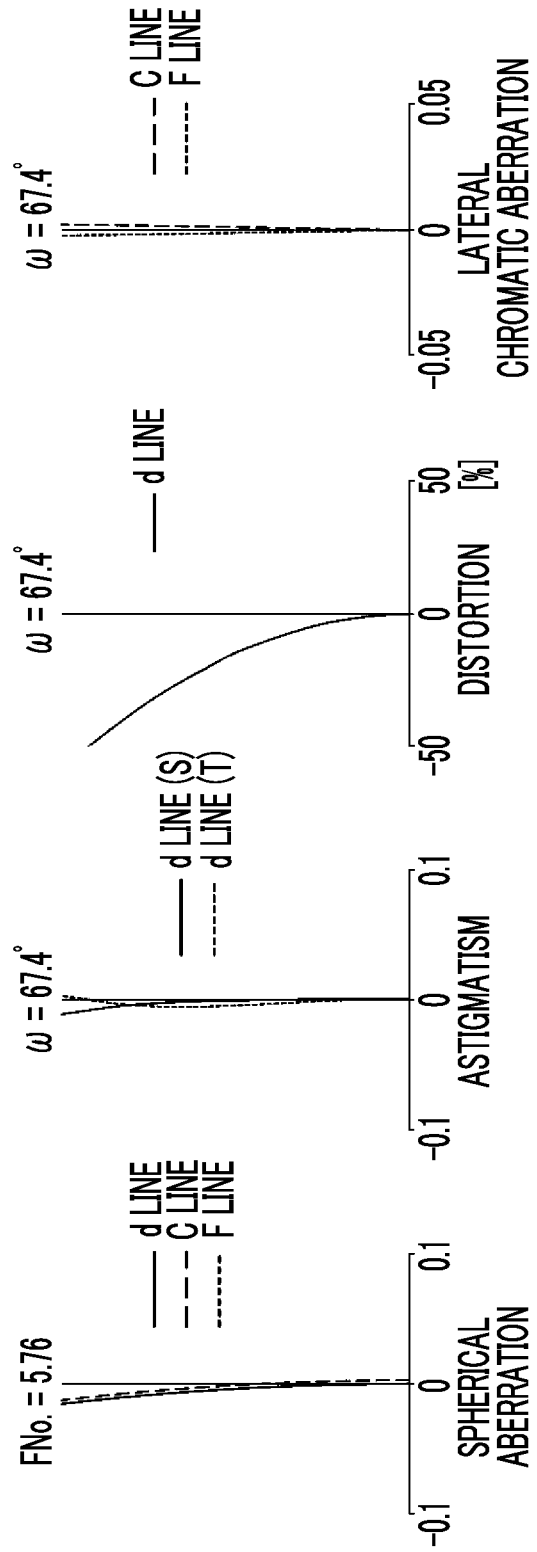
FIG. 15 is a diagram of aberrations of the objective lens for an endoscope according to Example 7.

Table 13 shows basic lens data of the objective lens for an endoscope according to Example 7, Table 14 shows a specification thereof, and FIG. 15 shows a diagram of aberrations in a case where the object distance is 9.7.

according to Example 8. The objective lens for an endoscope according to Example 8 consists of, in order from the object side to the image side, a first lens group G1 having a negative refractive power, a second lens group G2 having a positive refractive power, the aperture stop St, a third lens group G3 having a positive refractive power, and a fourth lens group G4 having a positive refractive power. The first lens group G1 consists of a lens L1 which is a negative lens. The lens L1 is a single lens. The second lens group G2 consists of a cemented lens formed by cementing a lens L2 which is a negative lens and a lens L3 which is a positive lens in order from the object side to the image side. The third lens group G3 consists of a cemented lens formed by cementing a lens L4 which is a positive lens and a lens L5 which is a negative lens in order from the object side to the image side. The fourth lens group G4 consists of a cemented lens formed by cementing a lens L6 which is a negative lens and a lens L7 which is a positive lens in order from the object side to the image side.

Figure 17:
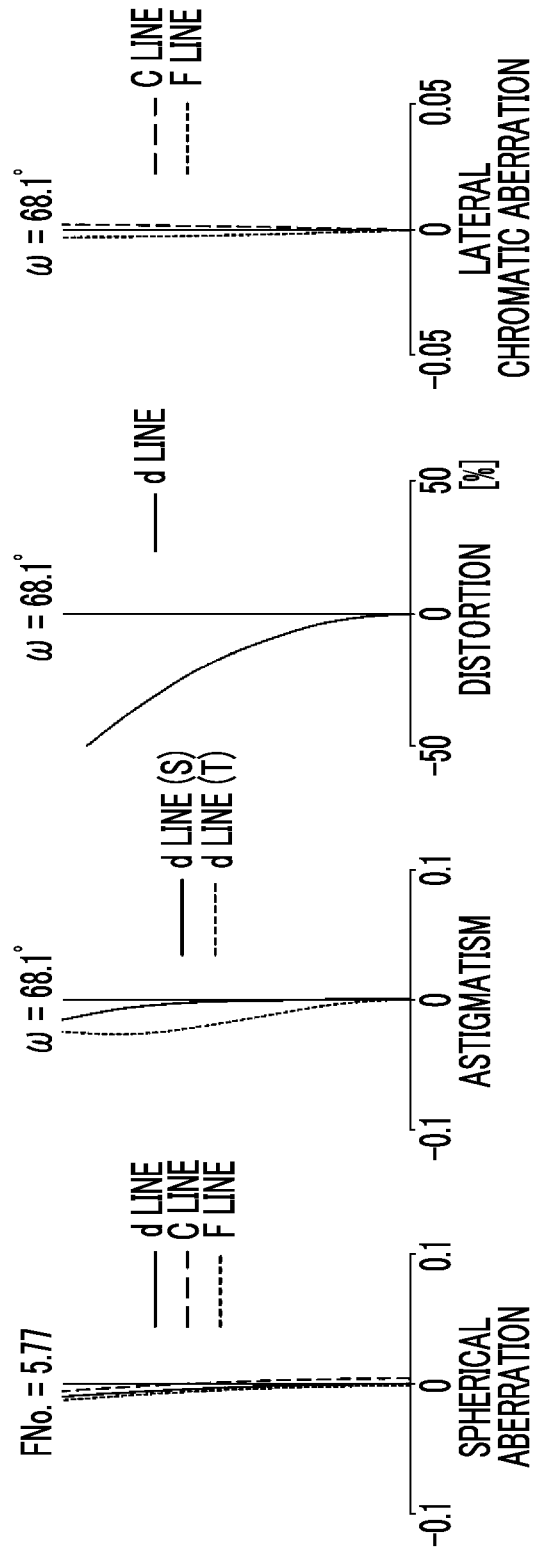
FIG. 17 is a diagram of aberrations of the objective lens for an endoscope according to Example 8.

Table 15 shows basic lens data of the objective lens for an endoscope according to Example 8, Table 16 shows a specification thereof, and FIG. 17 shows a diagram of aberrations in a case where the object distance is 10.0.

TABLE 13

Example 7

| Sn | R | D | Nd | vd |
|---|---|---|---|---|
| 1 | ∞ | 0.3324 | 1.72574 | 55.21 |
| 2 | 0.8693 | 0.3524 | | |
| 3 | 6.9422 | 0.4255 | 2.00000 | 28.00 |
| 4 | 1.2088 | 0.9839 | 1.79711 | 25.14 |
| 5 | −10.4940 | 0.2792 | | |
| 6(St) | ∞ | 0.1130 | | |
| 7 | −10.2233 | 0.9573 | 1.77521 | 50.48 |
| 8 | −1.3297 | 0.3058 | 1.42000 | 70.00 |
| 9 | −1.8995 | 0.1330 | | |
| 10 | 3.5391 | 0.8244 | 1.62840 | 60.25 |
| 11 | −1.6416 | 0.3058 | 1.99999 | 19.62 |
| 12 | −3.5769 | 0.4243 | | |
| 13 | ∞ | 2.8920 | 1.55920 | 53.92 |
| 14 | ∞ | 0.0000 | | |

TABLE 15

Example 8

| Sn | R | D | Nd | vd |
|---|---|---|---|---|
| 1 | 96.2950 | 0.4952 | 1.73921 | 54.08 |
| 2 | 0.7512 | 0.4815 | | |
| 3 | 17.3603 | 0.6190 | 2.00001 | 23.92 |
| 4 | 1.7195 | 1.1143 | 1.63000 | 35.00 |
| 5 | −1.3756 | 0.2063 | | |
| 6(St) | ∞ | 0.0481 | | |
| 7 | −9.3206 | 0.7016 | 2.00001 | 15.00 |
| 8 | −2.3136 | 0.8254 | 2.05001 | 20.90 |
| 9 | −3.2882 | 0.1376 | | |
| 10 | 3.9395 | 0.3439 | 2.05000 | 12.50 |
| 11 | 1.6879 | 1.0455 | 1.59250 | 65.77 |
| 12 | −3.0623 | 0.4300 | | |
| 13 | ∞ | 2.9920 | 1.55920 | 53.92 |
| 14 | ∞ | 0.0000 | | |

TABLE 14

Example 7

| | |
|---|---|
| f | 1.00 |
| Bf | 2.18 |
| FNo. | 5.76 |
| 2ω(°) | 134.8 |

TABLE 16

Example 8

| | |
|---|---|
| f | 1.00 |
| Bf | 2.26 |
| FNo. | 5.77 |
| 2ω(°) | 136.2 |

Example 8

Figure 16:
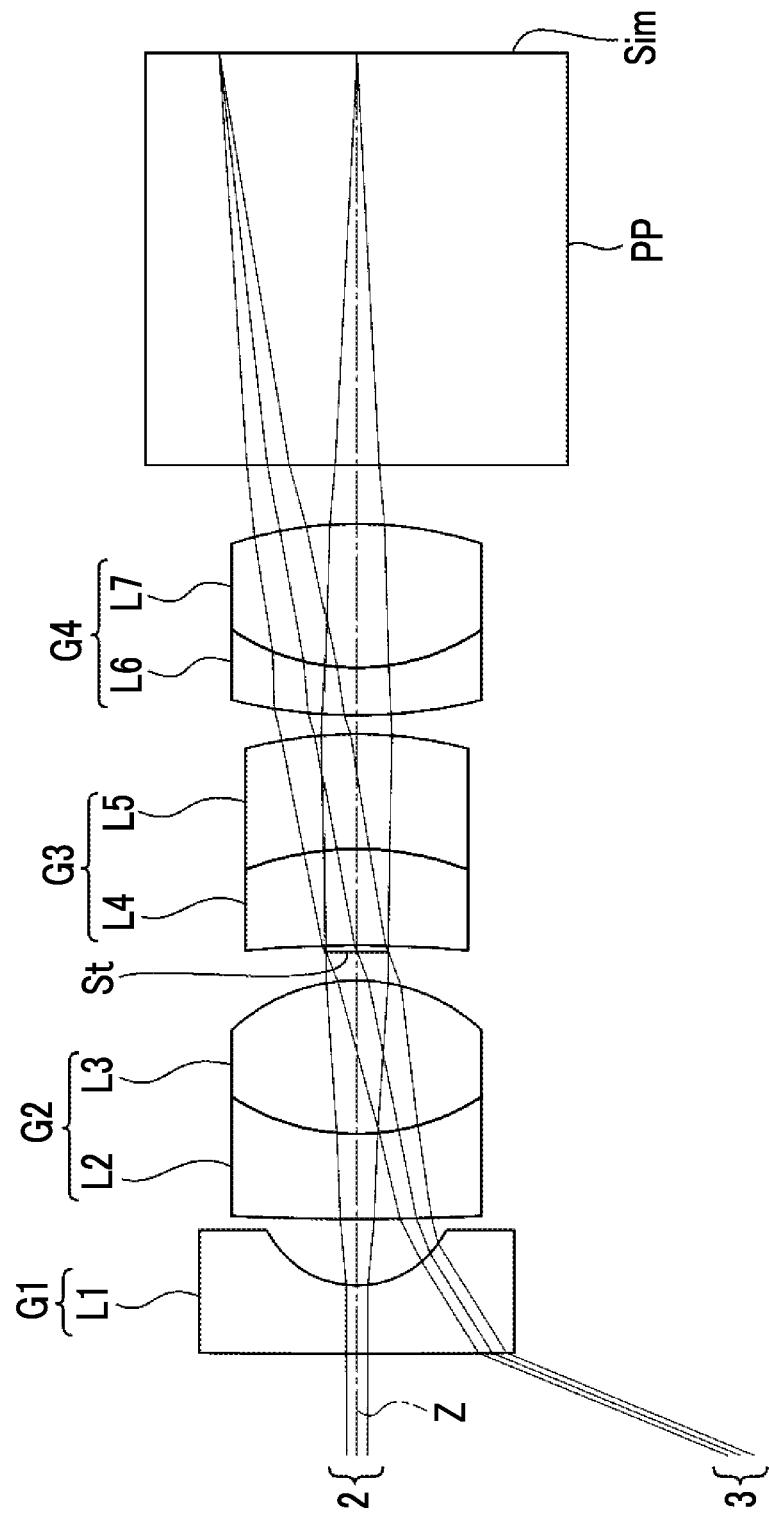
FIG. 16 is a cross-sectional view showing a configuration and rays of an objective lens for an endoscope according to Example 8.

FIG. 16 shows a cross-sectional view showing the configuration and rays of an objective lens for an endoscope Table 17 shows values of the objective lenses for an endoscope of Examples 1 to 8 corresponding to Conditional Expressions (1) to (8). In Examples 1 to 8, the d line is used as a reference wavelength. Table 17 shows each value on the d line basis.

TABLE 17

| Expression number | | Example 1 | Example 2 | Example 3 | Example 4 | Example 5 | Example 6 | Example 7 | Example 8 |
|---|---|---|---|---|---|---|---|---|---|
| (1) | (ν2f − ν2r) × |AL/R2c| | −202.48 | −23.78 | −21.29 | −56.39 | 9.81 | 11.08 | 11.84 | −38.76 |
| (2) | |νf − νr| × f/(AL + Bf) | 5.89 | 4.19 | 7.13 | 4.41 | 7.74 | 4.54 | 5.67 | 6.43 |
| (3) | (f3 × f4)/(f1 × f2) | −16.45 | −7.75 | −3.34 | −8.21 | −18.36 | −15.24 | −0.48 | −8.02 |
| (4) | (f2 × f3 × f4)/(f × f × f) | 60.91 | 49.47 | 93.99 | 63.79 | 45.35 | 40.41 | 184.78 | 69.71 |
| (5) | AL/Bf | 2.58 | 2.37 | 2.58 | 2.74 | 2.29 | 2.34 | 2.30 | 2.67 |

TABLE 17-continued

| Expression number | | Example 1 | Example 2 | Example 3 | Example 4 | Example 5 | Example 6 | Example 7 | Example 8 |
|---|---|---|---|---|---|---|---|---|---|
| (6) | |Df − Dr|/AL | 0.07 | 0.05 | 0.03 | 0.02 | 0.10 | 0.04 | 0.05 | 0.03 |
| (7) | f4/f3 | 0.45 | 1.05 | 2.22 | 1.15 | 0.46 | 0.80 | 1.86 | 1.14 |
| (8) | Dc4/Dc2 | 0.74 | 0.69 | 0.60 | 0.80 | 0.91 | 0.80 | 0.80 | 0.80 |

Although the objective lenses for an endoscope according to Examples 1 to 8 have small size, various aberrations including chromatic aberration are satisfactorily corrected to maintain high optical performance. In addition, the objective lenses for an endoscope according to Examples 1 to 8 have a maximum total angle of view of 130 degrees or more, and a wide viewing angle is ensured.

Figure 18:
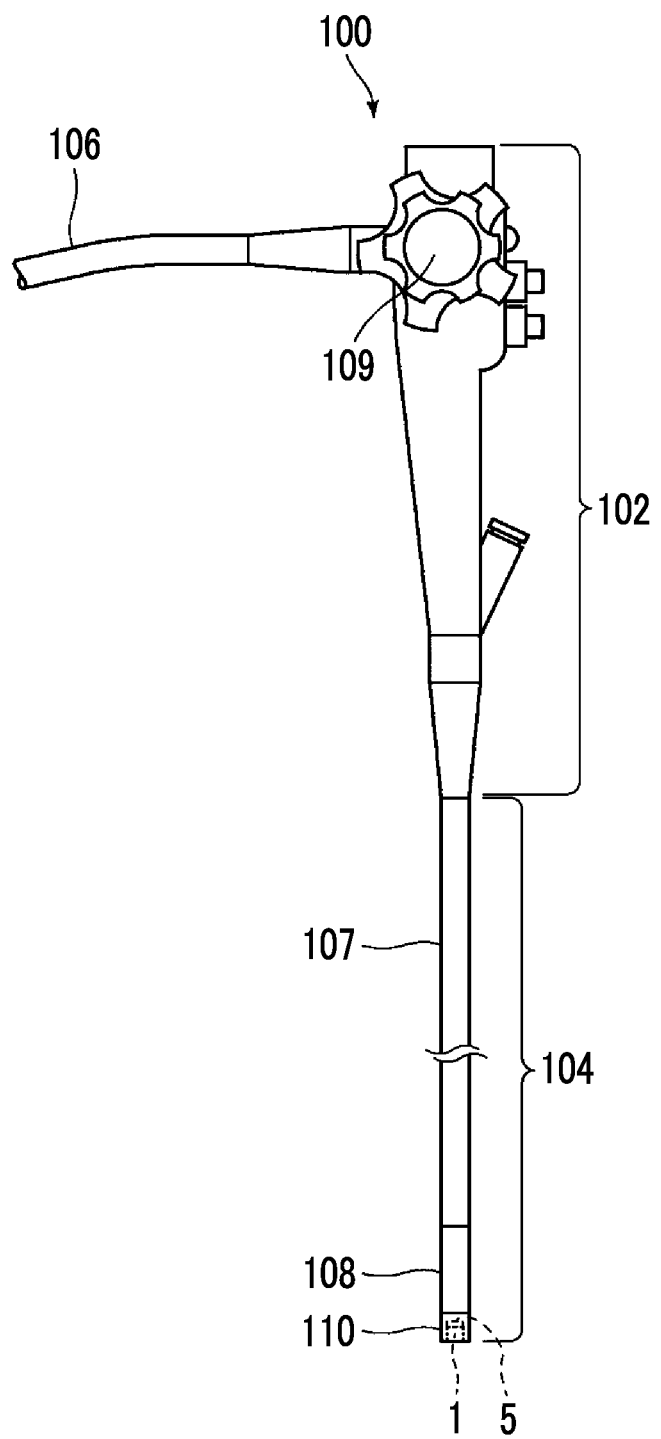
FIG. 18 is a schematic configuration diagram of an endoscope according to the embodiment of the present disclosure.

Next, an endoscope according to an embodiment of the present disclosure will be described. FIG. 18 shows a schematic overall configuration diagram of an endoscope according to an embodiment of the present disclosure. An endoscope 100 shown in FIG. 18 mainly comprises an operation part 102, an insertion part 104, and a universal cord 106 that is to be connected to a connector part (not shown). A large portion of the insertion part 104 is a soft portion 107 that is bendable in any direction along an insertion path, a bendable portion 108 is connected to the distal end of the soft portion 107, and a distal end portion 110 is connected to the distal end of the bendable portion 108. The bendable portion 108 is provided to allow the distal end portion 110 to turn in a desired direction, and can be operated to be bent by the rotational movement of a bending operation knob 109 provided on the operation part 102. The objective lens 1 for an endoscope according to the embodiment of the present disclosure and the imaging element 5 are provided in the distal end of the distal end portion 110. The imaging element 5 is a charge coupled device (CCD), a complementary metal oxide semiconductor (CMOS), or the like. The imaging element 5 is disposed so that the imaging surface of the imaging element 5 coincides with the image plane of the objective lens 1 for an endoscope. The objective lens 1 for an endoscope and the imaging element 5 in FIG. 18 are conceptually illustrated.

A technology of the present disclosure has been hitherto described through the embodiments and the examples, but the technology of the present disclosure is not limited to the above-mentioned embodiments and examples, and may be modified into various forms. For example, values such as the radius of curvature, the surface distance, the refractive index, and the Abbe number of each lens are not limited to the values shown in the examples, and different values may be used therefor.

What is claimed is:

1. An objective lens for an endoscope consisting of, in order from an object side to an image side:
   a first lens group consisting of one negative lens;
   a second lens group consisting of two lenses cemented together;
   a stop;
   a third lens group consisting of two lenses that have refractive powers with different signs and are cemented together; and
   a fourth lens group consisting of two lenses that have refractive powers with different signs and are cemented together,
   wherein assuming that an Abbe number of a lens on the object side in the second lens group at a d line is ν2f, an Abbe number of a lens on the image side in the second lens group at the d line is ν2r, a distance on an optical axis from a lens surface on the object side in the first lens group to a lens surface closest to the image side in the fourth lens group is AL, and a paraxial radius of curvature of a cemented surface in the second lens group is R2c,
   Conditional Expression (1) is satisfied, which is represented by $$-300 < (\nu 2f - \nu 2r) \times |AL/R2c| < 30 \tag{1}$$

2. The objective lens for an endoscope according to claim 1,
   wherein the second lens group has a positive refractive power as a whole.

3. The objective lens for an endoscope according to claim 1,
   wherein the third lens group has a positive refractive power as a whole.

4. The objective lens for an endoscope according to claim 1,
   wherein the fourth lens group has a positive refractive power as a whole.

5. The objective lens for an endoscope according to claim 1,
   wherein assuming that a focal length of the first lens group is f1, a focal length of the second lens group is f2, a focal length of the third lens group is f3, and a focal length of the fourth lens group is f4,
   Conditional Expression (3) is satisfied, which is represented by $$-30 < (f3 \times f4)/(f1 \times f2) < -0.2 \tag{3}$$

6. The objective lens for an endoscope according to claim 5,
   wherein Conditional Expression (3-1) is satisfied, which is represented by $$-20 < (f3 \times f4)/(f1 \times f2) < -0.4 \tag{3-1}$$

7. The objective lens for an endoscope according to claim 1,
   wherein assuming that a focal length of the objective lens for an endoscope is f, a focal length of the second lens group is f2, a focal length of the third lens group is f3, and a focal length of the fourth lens group is f4,
   Conditional Expression (4) is satisfied, which is represented by $$10 < (f2 \times f3 \times f4)/(f \times f \times f) < 300 \tag{4}$$

8. The objective lens for an endoscope according to claim 7,
   wherein Conditional Expression (4-1) is satisfied, which is represented by $$30 < (f2 \times f3 \times f4)/(f \times f \times f) < 200 \tag{4-1}$$

9. The objective lens for an endoscope according to claim 1,
   wherein assuming that an air conversion distance on the optical axis from the lens surface closest to the image side in the fourth lens group to a focal position on the image side of the objective lens for an endoscope is Bf,
Conditional Expression (5) is satisfied, which is represented by $$1 < AL/Bf < 4 \quad (5).$$

10. The objective lens for an endoscope according to claim 9,
wherein Conditional Expression (5-1) is satisfied, which is represented by $$2.2 < AL/Bf < 3 \quad (5\text{-}1).$$

11. The objective lens for an endoscope according to claim 1,
wherein assuming that a distance on the optical axis from the lens surface on the object side in the first lens group to the stop is Df, and a distance on the optical axis from the stop to the lens surface closest to the image side in the fourth lens group is Dr,
Conditional Expression (6) is satisfied, which is represented by $$|Df - Dr|/AL < 1 \quad (6).$$

12. The objective lens for an endoscope according to claim 11,
wherein Conditional Expression (6-1) is satisfied, which is represented by $$0.01 < |Df - Dr|/AL < 0.15 \quad (6\text{-}1).$$

13. The objective lens for an endoscope according to claim 1,
wherein assuming that a focal length of the third lens group is f3, and a focal length of the fourth lens group is f4,
Conditional Expression (7) is satisfied, which is represented by $$f4/f3 < 5 \quad (7).$$

14. The objective lens for an endoscope according to claim 13,
wherein Conditional Expression (7-1) is satisfied, which is represented by $$0.3 < f4/f3 < 3 \quad (7\text{-}1).$$

15. The objective lens for an endoscope according to claim 1,
wherein assuming that a thickness of the second lens group on the optical axis is Dc2, and a thickness of the fourth lens group on the optical axis is Dc4,
Conditional Expression (8) is satisfied, which is represented by $$Dc4/Dc2 < 1.2 \quad (8).$$

16. The objective lens for an endoscope according to claim 1,
wherein Conditional Expression (1-1) is satisfied, which is represented by $$-250 < (v2f - v2r) \times |AL/R2c| < 20 \quad (1\text{-}1).$$

17. An endoscope comprising:
the objective lens for an endoscope according to claim 1.

18. An objective lens for an endoscope consisting of, in order from an object side to an image side:
a first lens group consisting of one negative lens;
a second lens group consisting of two lenses cemented together;
a stop;
a third lens group consisting of two lenses that have refractive powers with different signs and are cemented together; and
a fourth lens group consisting of two lenses that have refractive powers with different signs and are cemented together,
wherein assuming that an Abbe number of a lens on the object side in the third lens group at a d line is v3f, an Abbe number of a lens on the image side in the third lens group at the d line is v3r, an Abbe number of a lens on the object side in the fourth lens group at the d line is v4f, an Abbe number of a lens on the image side in the fourth lens group at the d line is v4r, an expression having a larger value between |v3f−v3r| and |v4f−v4r| is |vf−vr|, a focal length of the objective lens for an endoscope is f, a distance on an optical axis from a lens surface on the object side in the first lens group to a lens surface closest to the image side in the fourth lens group is AL, and an air conversion distance on the optical axis from the lens surface closest to the image side in the fourth lens group to a focal position on the image side of the objective lens for an endoscope is Bf,
Conditional Expression (2) is satisfied, which is represented by $$3.9 < |vf - vr| \times f/(AL + Bf) < 20 \quad (2).$$

19. The objective lens for an endoscope according to claim 18,
wherein assuming that an Abbe number of a lens on the object side in the second lens group at the d line is v2f, an Abbe number of a lens on the image side in the second lens group at the d line is v2r, and a paraxial radius of curvature of a cemented surface in the second lens group is R2c,
Conditional Expression (1) is satisfied, which is represented by $$-300 < (v2f - v2r) \times |AL/R2c| < 30 \quad (1).$$

20. The objective lens for an endoscope according to claim 18,
wherein Conditional Expression (2-1) is satisfied, which is represented by $$4 < |vf - vr| \times f/(AL + Bf) < 10 \quad (2\text{-}1).$$

* * * * *